(12) United States Patent
Okude et al.

(10) Patent No.: US 6,175,802 B1
(45) Date of Patent: Jan. 16, 2001

(54) MAP DISPLAYING METHOD AND APPARATUS, AND NAVIGATION SYSTEM HAVING THE MAP DISPLAYING APPARATUS

(75) Inventors: Mariko Okude, Hitachi; Yoshinori Endo, Mito; Yasuhiro Gunji; Kozo Nakamura, both of Hitachioota, all of (JP)

(73) Assignee: Xanavi Informatics Corporation (JP)

( * ) Notice: Under 35 U.S.C. 154(b), the term of this patent shall be extended for 0 days.

(21) Appl. No.: 08/963,607

(22) Filed: Oct. 31, 1997

(30) Foreign Application Priority Data

Nov. 7, 1996 (JP) .................................................... 8-294919

(51) Int. Cl.$^7$ .............................. G01C 21/00; H04N 7/18
(52) U.S. Cl. ......................... 701/208; 348/118; 701/212
(58) Field of Search .................................... 701/208, 200, 701/212; 340/995, 990; 434/38, 43; 348/123, 118; 345/139, 425, 422

(56) References Cited

U.S. PATENT DOCUMENTS

| | | | |
|---|---|---|---|
| 4,903,216 | * | 2/1990 | Huss et al. ............................ 434/43 |
| 4,940,972 | | 7/1990 | Mouchot et al. ..................... 340/747 |
| 5,161,886 | * | 11/1992 | DeJong et al. ....................... 701/209 |
| 5,913,918 | * | 6/1999 | Nakano et al. ...................... 701/208 |

FOREIGN PATENT DOCUMENTS

| | | |
|---|---|---|
| 0 378 271 | 7/1990 | (EP) . |
| 0 473 152 A2 | 3/1992 | (EP) . |
| 0 678 731 A1 | 10/1995 | (EP) . |
| 0 749 103 A1 | 12/1996 | (EP) . |
| 0 802 516 A2 | 10/1997 | (EP) . |
| 2 524 177 | 9/1983 | (FR) . |
| 2-244188 | 9/1990 | (JP) . |
| 07262490 | 10/1995 | (JP) . |

* cited by examiner

*Primary Examiner*—Gregory C. Issing
(74) *Attorney, Agent, or Firm*—Pennie & Edmonds LLP

(57) ABSTRACT

The method entails using three dimensional map data including information Indicating horizontal locations of map constituent elements such as topographical features, roads, buildings and information indicating heights or elevations or altitudes of at least some of the map constituent elements located in parts of available horizontal map area. A perspective map looking from a view point toward a ground plane is generated by executing coordinate transformation procedures on the map information, and a scenery Image corresponding to the perspective map is displayed on a display device. The view point for generating the perspective map Is established above a height of a map element existing at a location specified in response to the current location of the moving object, and the height of the view point Is renewed with movement of the object. The view point setting unit repeats Its view point setting procedure when renewed location information has movement of the moving object.

27 Claims, 22 Drawing Sheets

VEHICLE LOCATION SYMBOL

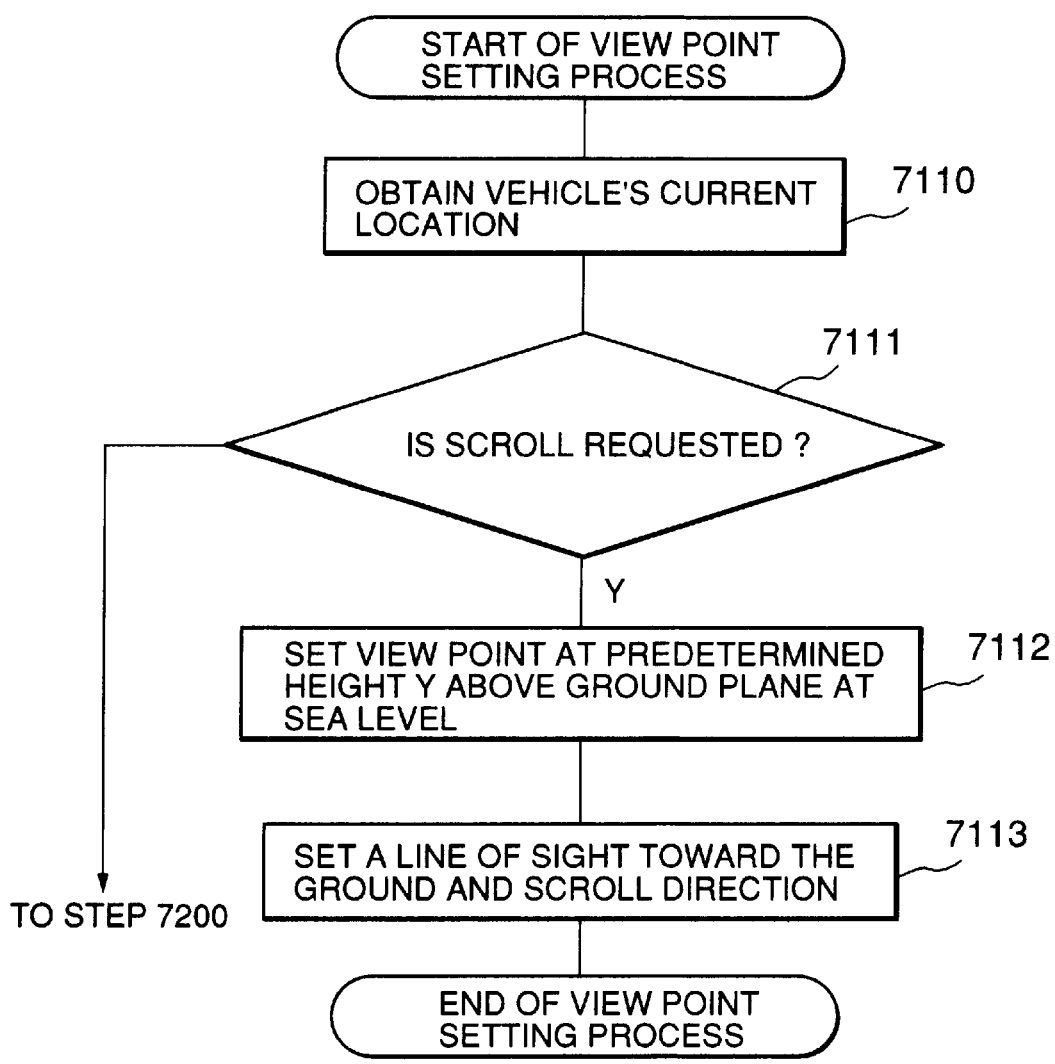

MAP DISPLAYING METHOD AND APPARATUS, AND NAVIGATION SYSTEM HAVING THE MAP DISPLAYING APPARATUS

BACKGROUND OF THE INVENTION

1. Field of the Invention

The present invention is related to a map displaying method and apparatus, and a navigation system having such a map displaying apparatus. Particularly, the present invention is related to a stereoscopic map displaying method beneficial for the navigation system in which map information is selected from a map database according to a current location of a mobile object such as an automobile, and a perspective map viewing the ground surface along a direction angled to the ground surface is displayed.

2. Description of Related Art

The navigation system is known as an apparatus which assists a driver of an automobile by fetching digital map data stored in storage media such as CD-ROM, displaying a map showing buildings, roads and the like on a display screen, and superposing a current location of the automobile and a direction toward its destination on the map, which are detected by various sensors such as GPS.

A recent navigation system, such as disclosed in Japanese Patent Application Publication (KOKAI) No. 2-244188, uses a pseudo three dimensional display method in which a coordinate transformation of two dimensional map information is executed to generate a pseudo three dimensional image so as to display the map information in the vicinity of the current automobile location in a more easily recognizable manner. The pseudo three dimensional display may give a kind of three dimensional impression to a viewer using the two dimensional map information because, in the pseudo three dimensional display, a view point is set at a predetermined position above the automobile, and a perspective image viewed along a viewing direction which makes an acute angle with respect to the ground plane is displayed.

The pseudo three dimensional display of the prior art is generated from the two dimensional map information using the view point determined while assuming a flat ground surface. This may cause some problems if the stereoscopic map display method mentioned above is executed using three dimensional map information including information regarding a topographical elevation, instead of the two dimensional map information.

Namely, the three dimensional map information contains topographical information such as elevations of mountains, buildings or the like. If such three dimensional information is used and the view point is established with respect to the ground plane at sea level (altitude of 0 m) in the same way as that of the pseudo three dimensional display method, the established view point may end up inside a mountain which protrudes above the ground plane, depending on its height. If that is the case, the navigation system may not be able to display a location of the automobile or carry out the navigation procedure.

SUMMARY OF THE INVENTION

The present invention is invented in light of the above mentioned problems, and has an object to provide a map display method and apparatus which enable a stereoscopic map display using three dimensional map data including information indicating horizontal locations of map constituent elements such as topographical features, roads, buildings, and information indicating heights or elevations or altitudes of at least some of the map constituent elements which are located in at least a part of the available horizontal map area.

Another object of the present invention is to provide a navigation system having a stereoscopic map display function which enables renewal of contents of the display smoothly with movement of a vehicle even with the topographic variation or ups and downs of roads.

The above objects of the present invention are accomplished by a map display method in which map information in an area specified in response to a current location of a moving object is read from a map database; a perspective map viewed from a view point toward a ground plane is generated by executing coordinate transformation procedures on the map information; and a scenery image corresponding to the perspective map is displayed on a display device, wherein the view point for generating the perspective map is established above a height of a map constituent element existing at a location specified in response to the current location of the moving object, and the height of the view point is renewed with movement of the moving object.

Further, the above objects of the present invention are accomplished by a map display method in which a perspective map is generated using map information in an area specified in response to a location indicated by input location information, and a scenery image corresponding the perspective map is displayed, wherein a map database which contains the map information includes information regarding heights of map constituent elements existing at least in a part of the available map area; a view point for generating the perspective map is established above a height of a map constituent element existing at a map location specified in response to the location indicated by the input location information when information regarding the height of the constituent element is available; and the height of the view point is reestablished when new input information is provided.

Further, the above objects of the present invention are accomplished by a map display apparatus in which a perspective map is generated from map information in an area specified in response to a location indicated by input location information; and graphic data for displaying a scenery image corresponding the perspective map is outputted; comprising a view point setting unit for establishing at least a height of the view point among variables to be set to generate the perspective map, and a display processing unit for generating the graphic data for displaying the scenery image corresponding the perspective map generated in response to the view point set by the view point setting unit, wherein the view point setting unit establishes a height of the view point above an elevation of a topographical feature at a map location which is specified in response to the location indicated by the input location information when information regarding the elevation of topographical feature is available.

Further, the objects of the present invention are accomplished by a navigation system comprising a map database device, a current location detection device, a map display device for generating a perspective map from map information in an area specified in response to the current location of an automobile, and generating graphic data for displaying a scenery image corresponding the perspective map, and a display device, wherein the map display device comprises a view point setting unit for executing at least a setting procedure of the view point among variables to be set for generating the perspective map, and a display processing unit for generating graphic data for displaying a scenery image corresponding to the perspective map generated in response to the view point established by the view point setting unit, and the view point setting unit establishes a height of the view point above an elevation of a topographical feature at a map location which is specified in response to the detected current location of the automobile when information regarding the elevation of a topographical feature is available.

BRIEF DESCRIPTION OF THE DRAWINGS

FIG. 18 is a flowchart for illustrating the view point setting method which varies a height of the view point according to a selection of Scroll or not;

DESCRIPTION OF THE PREFERRED EMBODIMENTS

An embodiment of the present invention will now be described with reference to the figures.

Figure 1:
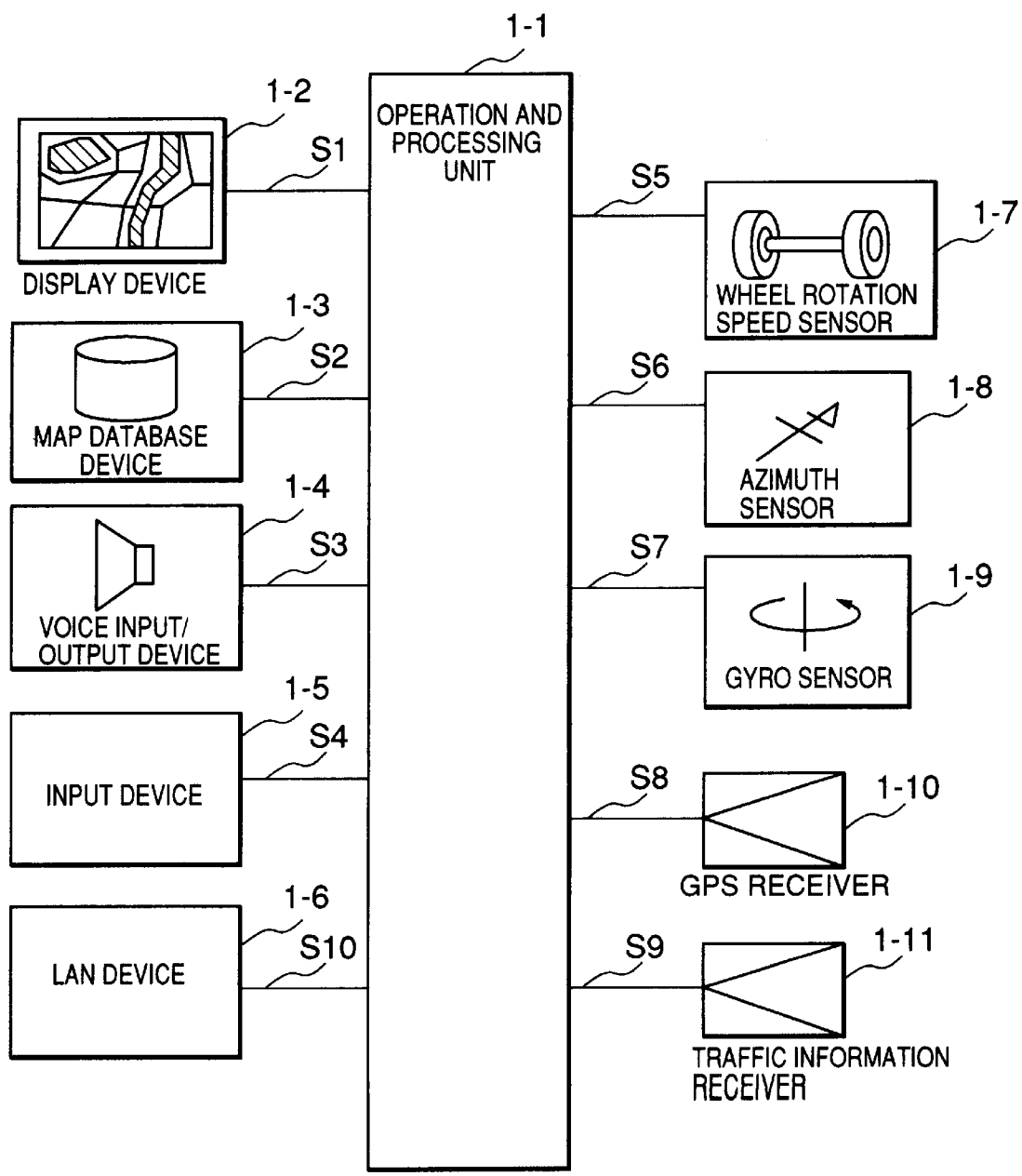
FIG. 1 is a block diagram showing a construction of the navigation system in an embodiment of the present invention.

As shown in FIG. 1, a navigation system according to the embodiment comprises, for example, an operation and processing unit 1-1, a display device 1-2, a map database unit 1-3, a voice input/output device 1-4, and an input device 1-5.

The operation and processing unit 1-1 is a main unit for various processing such as detecting a current location of the vehicle based on output information from sensors 1-7–1-10 which will be described later, graphically developing a map image from the map information which is necessary for the display and read from the map database unit 1-3 in correspondence with the detected current location of the vehicle, and superposing a vehicle symbol on the map image for indicating the current location of the vehicle which is detected by the sensors 1-7–1-10; or calculating the best fitted route to a location requested by a user via the input device 1-5 (for example, from the current location to a designated destination), and guiding the user along the best fitted route using the voice input/output device 1-4 and/or the display device 1-2.

The display device 1-2 is a unit for displaying the graphic information generated in the operation and processing unit 1-1, and comprises a CRT or a liquid crystal display device or the like. Typically, an RGB signal or NTSC (National Television System Committee) signal is used for a S1 signal connecting the operation and processing unit 1-1 and the display device 1-2.

The map database unit 1-3 comprises a storage medium with a large capacity such as CD-ROM, a IC card or DVD (Digital Video Disc), and carries out read/write processing of the necessary map data. The voice input/output device 1-4 transforms a message for the user, which is generated by the operation and processing unit 1-1, to a voice signal and outputs the voice signal, as well as recognizing a user's voice and transferring its content to the operation and processing unit 1-1.

The input device 1-5 is a unit for accepting various operation commands, which will be described later, from the user, and comprises hardware switches such as a scroll key for scrolling the displayed map, a scale change key for changing a scale of the displayed map, a joystick, and a touch panel disposed on the display screen.

The system of the embodiment further comprises sensors to be used for detecting a current location of the vehicle in a moving vehicle navigation operation, such as a wheel rotation speed sensor 1-7 for measuring a distance by multiplying a detected rotation rate of the wheel by a circumference of the wheel; an azimuth sensor 1-8 for detecting an azimuth on which the vehicle is heading by measuring a geomagnetic field of the earth; a gyro sensor 1-9 for detecting a rotation angle of the vehicle comprising an optical fiber gyro or an oscillating gyro; a GPS receiver 1-10 for determining the current location, the heading direction and the heading azimuth of the vehicle by receiving signals from three or more GPS satellites simultaneously and measuring ranges and range rates between the vehicle and the GPS satellites.

The system of the embodiment further comprises a traffic information receiver 1-11 for receiving signals from an FM multiplex broadcast station or a beacon transmitter which transmits a traffic information signal regarding traffic congestion, road construction or road closures, available parking, and the like. Further, the system comprises a vehicle LAN device 1-6 for receiving various information about the vehicle status such as open/close of doors, status and types of the lights which are turned on, status of engine, and a result of a problem diagnosis operation.

Figure 2:
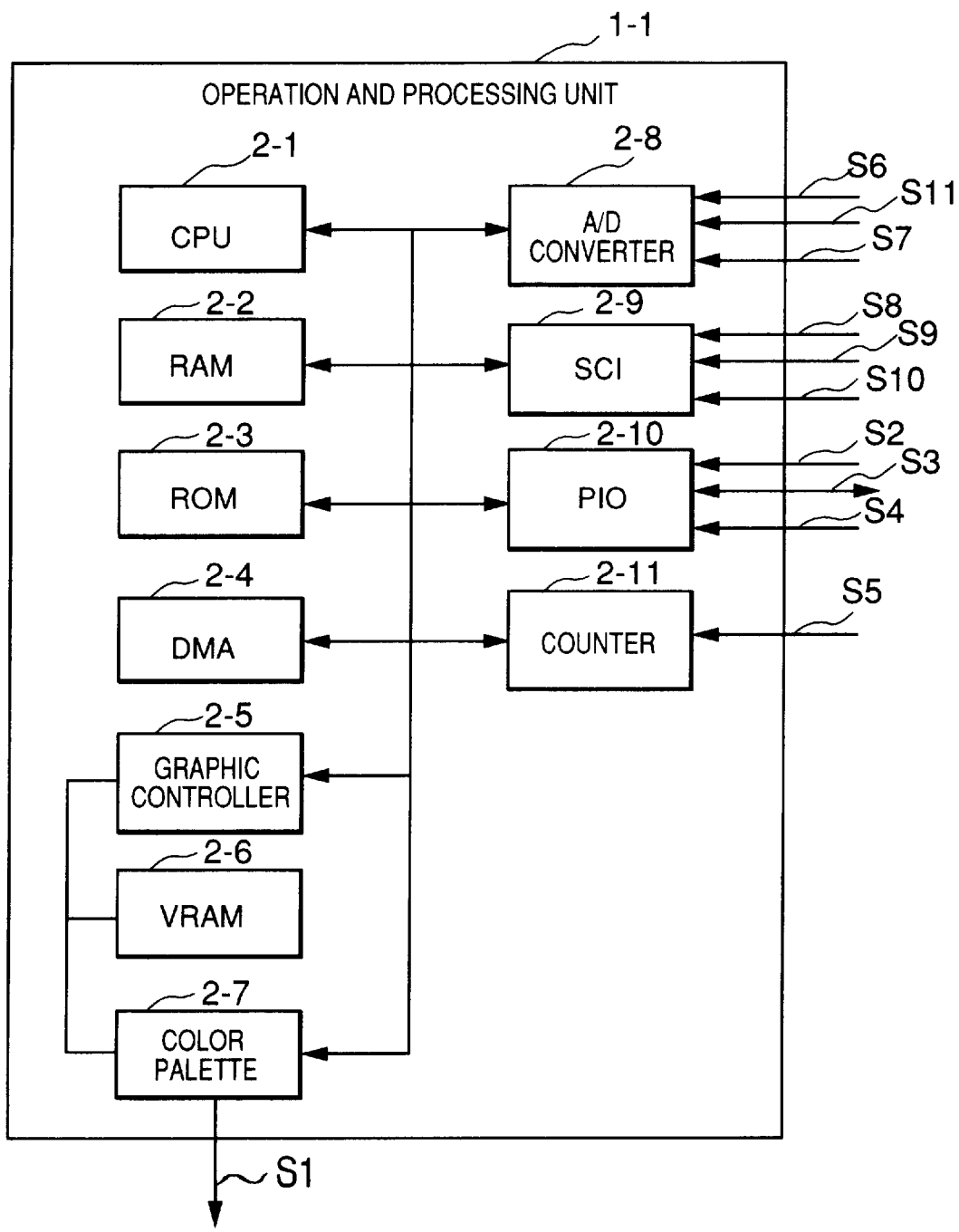
FIG. 2 is a block diagram showing a hardware construction of an operation and processing unit 1-1 of FIG. 1.

FIG. 2 shows an example of a hardware structure of the operation and processing unit 1-1.

The operation and processing unit 1-1 comprises the following devices which are interconnected to each others through a bus. These constituent devices are a CPU 2-1 executing various operations such as a numerical operation or a control of the devices, a RAM 2-2 storing map data or operation data, a ROM 2-3 storing programs or data, a DMA (Direct Memory Access) 2-4 for executing a high speed data transfer between the memories and between the memory and the device, a graphic controller 2-5 executing various graphic imaging operations such as development of vector data to pixel information and control of the display operation, a VRAM 2-6 storing graphic image data, a color palette 2-7 converting the image data to the RGB signal, an A/D converter 2-8 converting an analog signal to a digital signal, a SCI 2-9 converting a serial signal to a bus-synchronized parallel signal, a PIO 2-10 sending the signal on the bus while synchronizing with the parallel signal, and a counter 2-11 accumulating a pulse signal.

Figure 3:
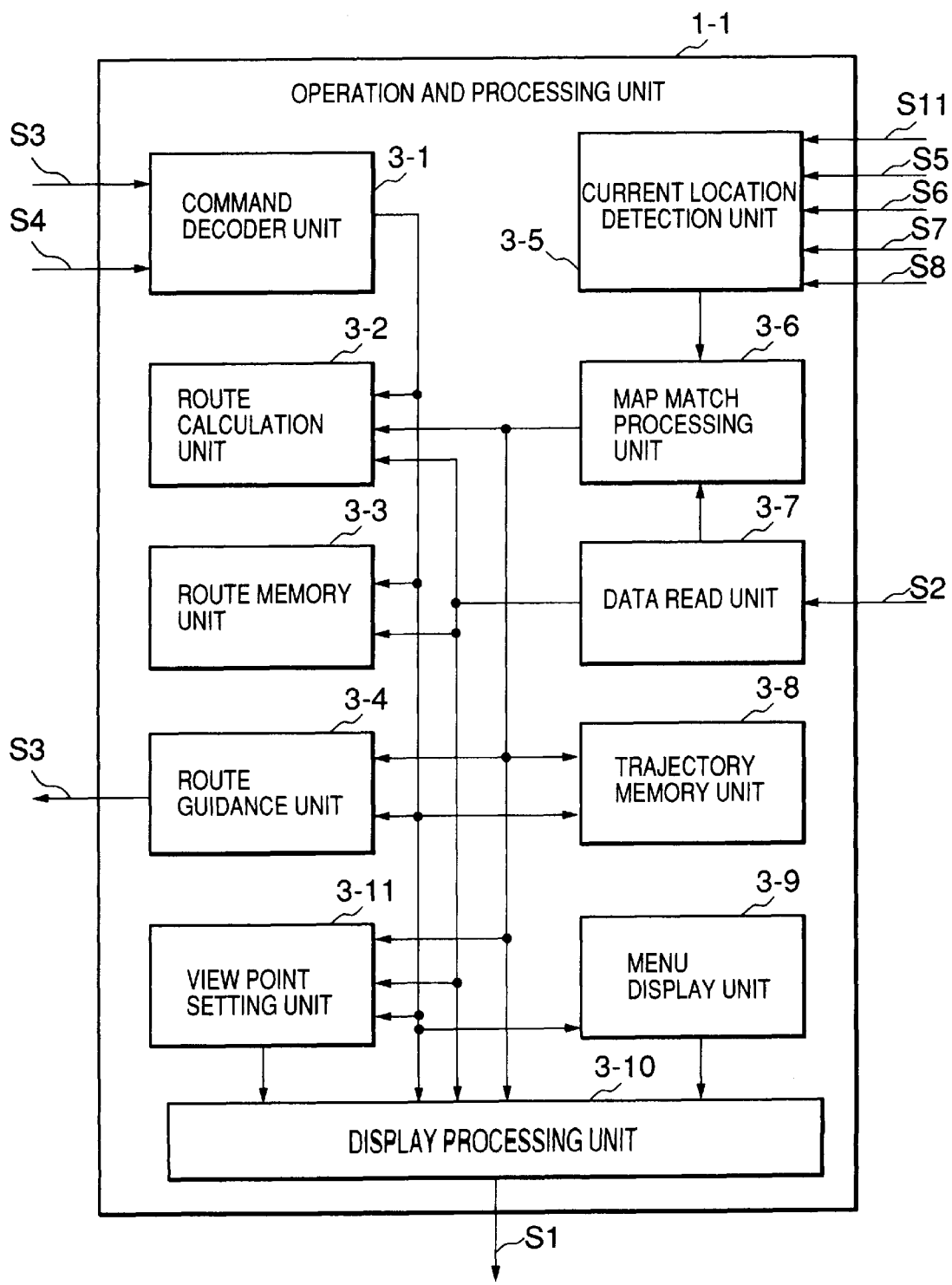
FIG. 3 is a block diagram showing a functional construction of the operation and processing unit 1-1 of FIG. 1.

FIG. 3 shows a functional structure realized by the operation and processing unit 1-1 having the hardware structure mentioned above. Each of the functional blocks will now be described.

A current location detection unit 3-5 executes operations to obtain a location of the vehicle after its movement (X',Y') from an initial location (X,Y) using range and angle data obtained by integrating range pulse data S5 measured at the wheel rotation speed sensor 1-7 and angular acceleration data S7 measured at the gyro 1-9, and further time-integrating these data. Further in the location calculation unit 3-5, the absolute azimuth on which the vehicle is heading is corrected using the azimuth data S6 from the azimuth sensor 1-8 and the angle data obtained by integrating the angular acceleration data S7 from the gyro 1-9 so as to bring the rotation angle of the vehicle and the moving azimuth into agreement. Further, the current location detection unit 3-5 may output information regarding the current location of the vehicle, after executing an operation, which cancels out errors accumulated in the data outputted from the above mentioned sensors due to their data integration operations, using location data S8 which is periodically obtained at the GPS receiver at a certain period when the location data S8 is available.

Information regarding the current location obtained in this way contains errors originated in the sensor data. Thus, a map match processing unit 3-6 is provided to further increase accuracy in detecting the current location of the vehicle. The map match processing unit 3-6 executes operations such as comparing road data, which is included in the map in the vicinity of the current location of the vehicle read by the data read unit 3-7, and a trajectory of the vehicle obtained from the current location detection unit 3-5, and correcting the current location so that the corrected location gives the best correlation between shapes of the road data and the vehicle's trajectory. In many cases, the map matching process enables fitting of the current location into a road on which the vehicle is actually moving, and thus outputting of a precise current location of the vehicle.

The information regarding the current location of the vehicle is stored in a trajectory memory unit 3-8 every time the vehicle has moved a certain distance. The trajectory data is used to generate a graphic image for marking the trajectory of vehicle on roads of the corresponding map, where the vehicle had traveled.

A command decoder unit 3-1 accepts requirements (commands) from a user through the input device 1-5, analyzes contents of the requirements, and controls each of the units so as to execute operations in response to the contents. For example, when the user requests a route guidance to a destination, the command decoder unit 3-1 requests a display processing unit 3-10 to carry out operations to display a map for setting the destination, and further requests a route calculation unit 3-2 to carry out operations to calculate a route from the current location to the destination.

The route calculation unit 3-2 searches for a route between the designated locations from the map data using the Dijkstra algorithm or the like, and stores the route in a route memory unit 3-3. The route calculation unit 3-2 may calculate several types of routes such as the shortest route between the designated locations, a route which is reachable within the shortest travel time, and the most inexpensive route.

A route guidance unit 3-4 compares link information for the route guiding stored in the route memory unit 3-3 with the current vehicle location information obtained in the current location detection unit 3-5 and the map match processing unit 3-6, and guides the user by vocally notifying whether or not to go straight or turn left/right using a voice input/output device 1-4 a predetermined period of time before the vehicle pass through an intersection, or superposing a mark indicating a direction in which the vehicle should be directed on the map displayed on a screen of the display device 1-2.

The data read unit 3-7 is operated to fetch and prepare map data of a requested area from the map database unit 1-3.

The view point setting unit 3-11 is one of characteristic features of the present invention, which establishes variables such as a view point, a line of sight, a view angle, which should be established for the map display method of the present invention.

The display processing unit 3-10 receives the map data in the vicinity of a location which is requested to be displayed from the data read unit 3-7, develops the map data into a graphic image using the view point/the line of sight/the view angle established by the view point setting unit 3-11 and using a display scale, an imaging method, an imaging azimuth designated by the command decoder unit 3-1, and transfers the developed graphic image to the VRAM 2-6. A menu display unit 3-9 accepts various requests output from the command decoder unit 3-1, and transfers images of various types of menus or symbols which are requested to the display processing unit 3-10 for superposing the images on the displayed map.

Figure 4:
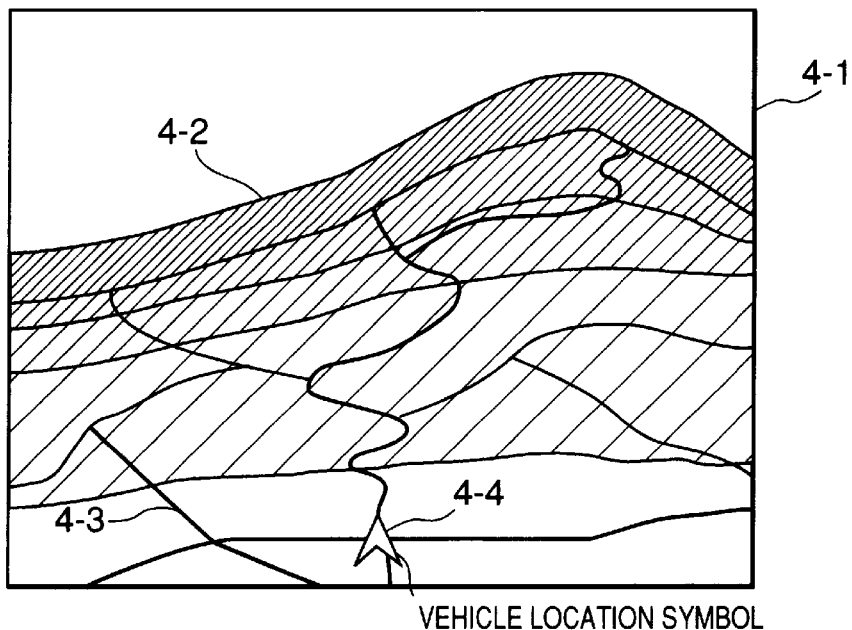
FIG. 4 is an explanatory illustration showing an example of a stereoscopic display according to a display method of the present invention.

FIG. 4 shows an example of the stereoscopic map display, which is displayed by the device of the present embodiment and in which a part of the map data such as topographical features, roads, etc. are graphically developed into an image to be displayed. There, 4-2 is a mountain drawn based on the topographic elevation data (altitude data), 4-3 is roads which are line-drawn using a fixed width, and 4-4 is a symbol indicating the current location of the vehicle. The display example 4-1 is generated by reading out the map data in the vicinity of the current location of the vehicle from the map database unit 1-3 based on the current location of the vehicle output from the sensor system, and displaying a scenery image (perspective map) viewed from a view point established above the vehicle in the air using a method of the present invention.

Figure 5:
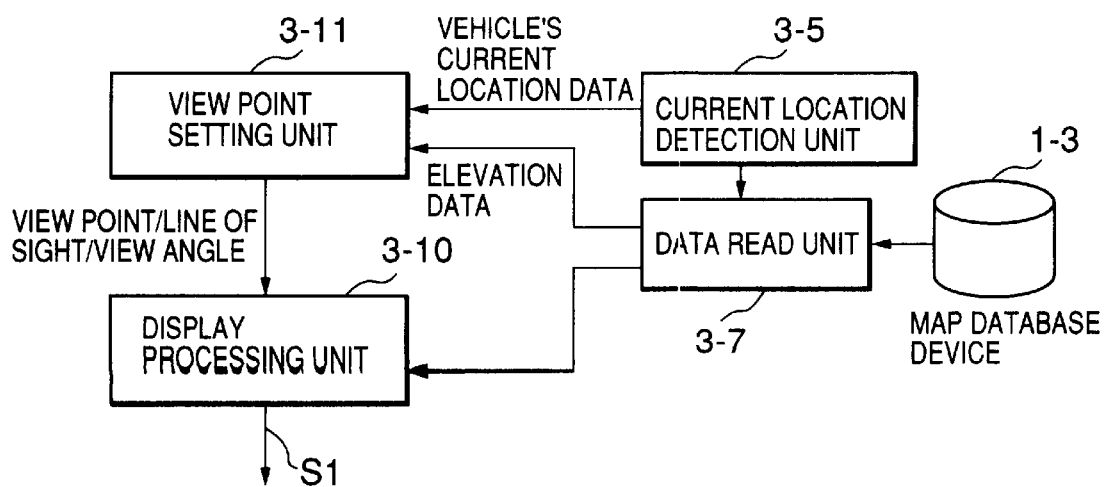
FIG. 5 is a block diagram for illustrating data flows in the display method of the present invention.

FIG. 5 shows an example of a data flow when a stereoscopic map like the one in FIG. 4 is displayed.

The data read unit 3-7 reads out the map data in the vicinity of the vehicle's current location from the map database unit 1-3 based on the current location of the vehicle detected at the current location detection unit 3-5. The view point setting unit 3-11 reads the current location of the vehicle detected at the current location detection unit 3-5 and the map data containing topographical features, roads, buildings from the data read unit 3-7, and establishes variables such as the view point, the line of sight, the view angle, etc. which should be established for the stereoscopic map display.

The display processing unit 3-10 carries out a coordinate transformation of the map data in the vicinity of the vehicle according to the view point, the line of sight and the view angle established by the view point setting unit 3-11, and generates the perspective map image to be displayed. The map match processing unit 3-6, which obtains the vehicle's current location with a higher accuracy and inputs the accurate current location to the view point setting unit 3-11 and the display processing unit 3-10 as shown in FIG. 3, is omitted here in FIG. 5, assuming that the current location detection unit 3-5 can obtain the current location of the vehicle with a high enough accuracy.

The coordinate transformation operation used in the display method of the present embodiment will now be described with reference to FIG. 6.

A perspective map 6-6 is generated by projecting a topographical feature 6-2 situated above a ground plane 6-4 at sea level onto a screen (view plane) 6-3 disposed between the view point (view reference point) 6-1 and the topographical feature 6-2 through a series of coordinate transformations. The series of coordinate transformations comprise, for example, the first transformation for transforming the map data expressed in an object coordinate to that of a world coordinate, the second transformation for transforming the result of the first transformation into a view point coordinate whose origin is set at the view point 6-1, and the third transformation for transforming the result of the second transformation into a screen coordinate so as to project the result of the second transformation onto the screen 6-3.

According to the series of coordinate transformations, the perspective map 6-6 in a screen window corresponding to a part of the topographic feature may be generated depending on a spatial relationship between the view point 6-1 and the topographic feature 6-2. In the present embodiment, the display device 1-2 displays a graphic image generated using data of the perspective map 6-6 so as to show scenery (a scenic image) which is supposed to be seen when a part of the topographic feature 6-5 is viewed from above in the air.

Figure 6:
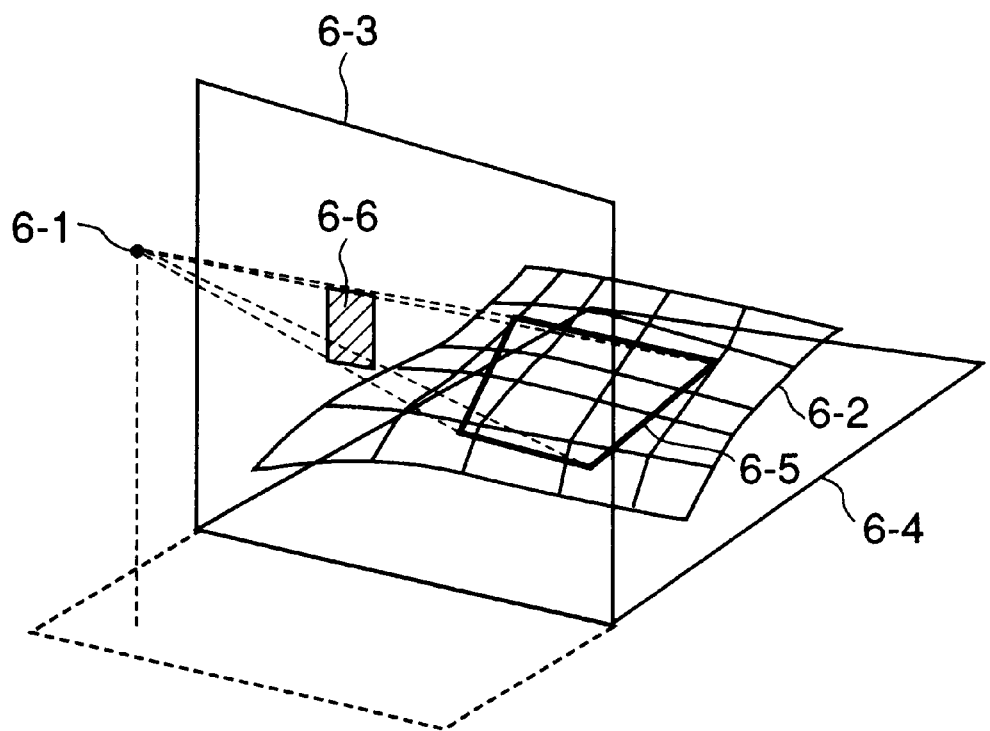
FIG. 6 is an explanatory illustration showing a concept of the coordinate transformation in the map display.

In this specification, "the ground plane at sea level" means a flat plane like the plane 6-4 shown in FIG. 6, and "the ground plane" means a surface of the ground plane like 6-2.

Figure 7:
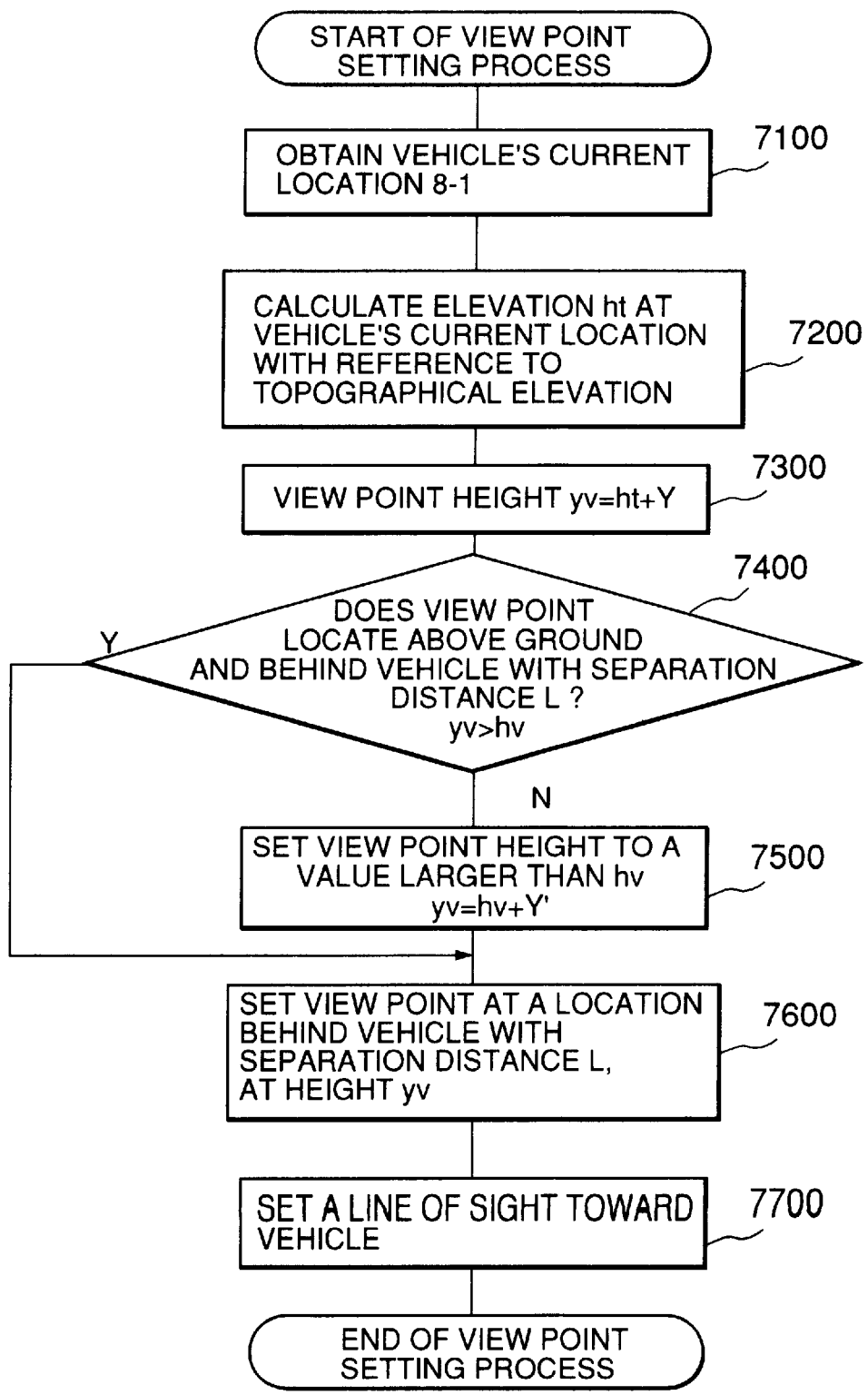
FIG. 7 is a flowchart for illustrating a view point setting method, which is a feature of the present invention.
Figure 8:
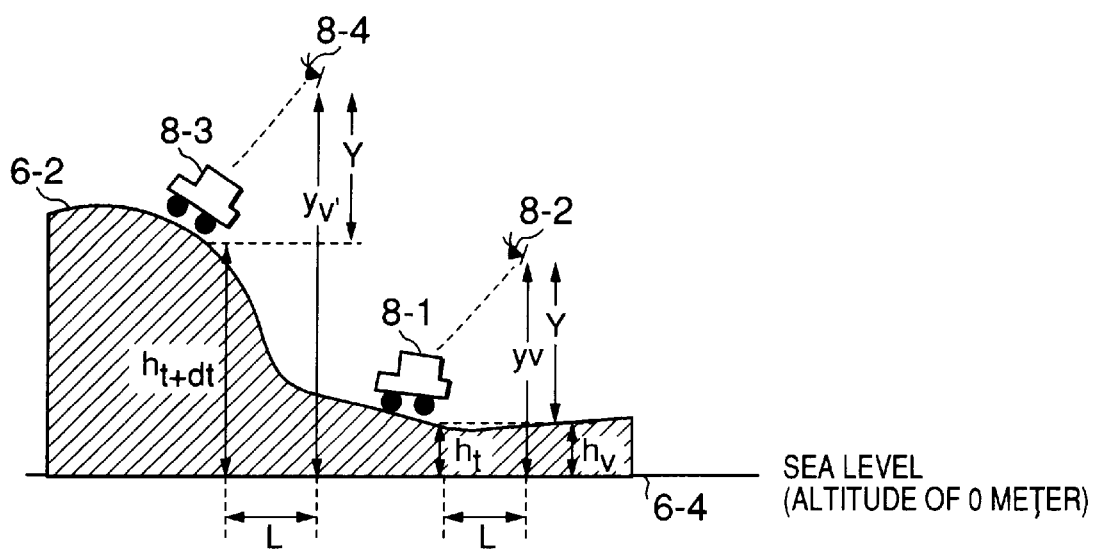
FIG. 8 is an explanatory illustration for supplementing FIG. 7.

An example of the procedure in the view point setting unit 3-11 of the present embodiment will now be described with reference to FIGS. 7 and 8. FIG. 7 is a flowchart of the procedure steps, and FIG. 8 is an explanatory illustration for supplementing FIG. 7. In the following, a location of the vehicle is assumed to be at a point 8-1.

First, the current location of the vehicle 8-1 is obtained from the current location detection unit 3-5 or through the map match processing unit 3-6 (Step 7100). Then, a height (elevation) $h_t$ at the current location of the vehicle is calculated based on data regarding a height of the topographical feature (elevation data), which are obtained through the data read unit 3-7 (Step 7200). If the accuracy of data in the height direction of GPS signal for detecting the current location of the vehicle is considered to be high enough, Step 7200 may be skipped.

Next, a predetermined height Y is added to the vehicle elevation $h_t$ for calculating a view point height $y_v$ so as to set the view point above the vehicle elevation $h_t$ (Step 7300). In the Step 7400, it is decided if the established view point is above the ground plane or not by comparing the view point height $y_v$ and an elevation $h_v$ at a location which is behind the vehicle's current location with a predetermined separation distance L.

If it is decided that the view point is above the ground plane (Y at Step 7400), the view point 8-2 is finally established behind the vehicle's current location with the predetermined separation distance L and at the height $y_v$ (Step 7600), and the line of sight of the view point is set toward the vehicle's current location 8-1 (Step 7700). If the view point is located under the ground plane (N at Step 7400), $y_v$ is reset so as its value becomes larger than $h_v$ (Step 7500), and then the operation procedure moves to Step 7600.

As described above, the present procedure enables setting and resetting of the height of the view point so that the view point is always located above in the air while the vehicle is moving.

Alternatively, the view point height $y_v$ ($y_v'$ at a location 8-3) may be set using a fixed height difference Y between the vehicle and the view point as the vehicle moves from the location 8-1 to the location 8-3 as shown in FIG. 8. This makes it possible to fix a relative spatial relationship between the vehicle's location and the view point.

According to the procedure shown in FIG. 7, the spatial relationship may be maintained in a normal situation, and the location of the view point may be set always above in the air by executing an exceptional step like Step 7500 even when there is a large amount of the topographical variation.

It is obvious that the setting method of the view point height in the present embodiment may be also applicable in the same way as mentioned above even when the topographical elevation or the road elevation is less than sea level, i.e. even when the elevation values are less than zero.

Figure 9:
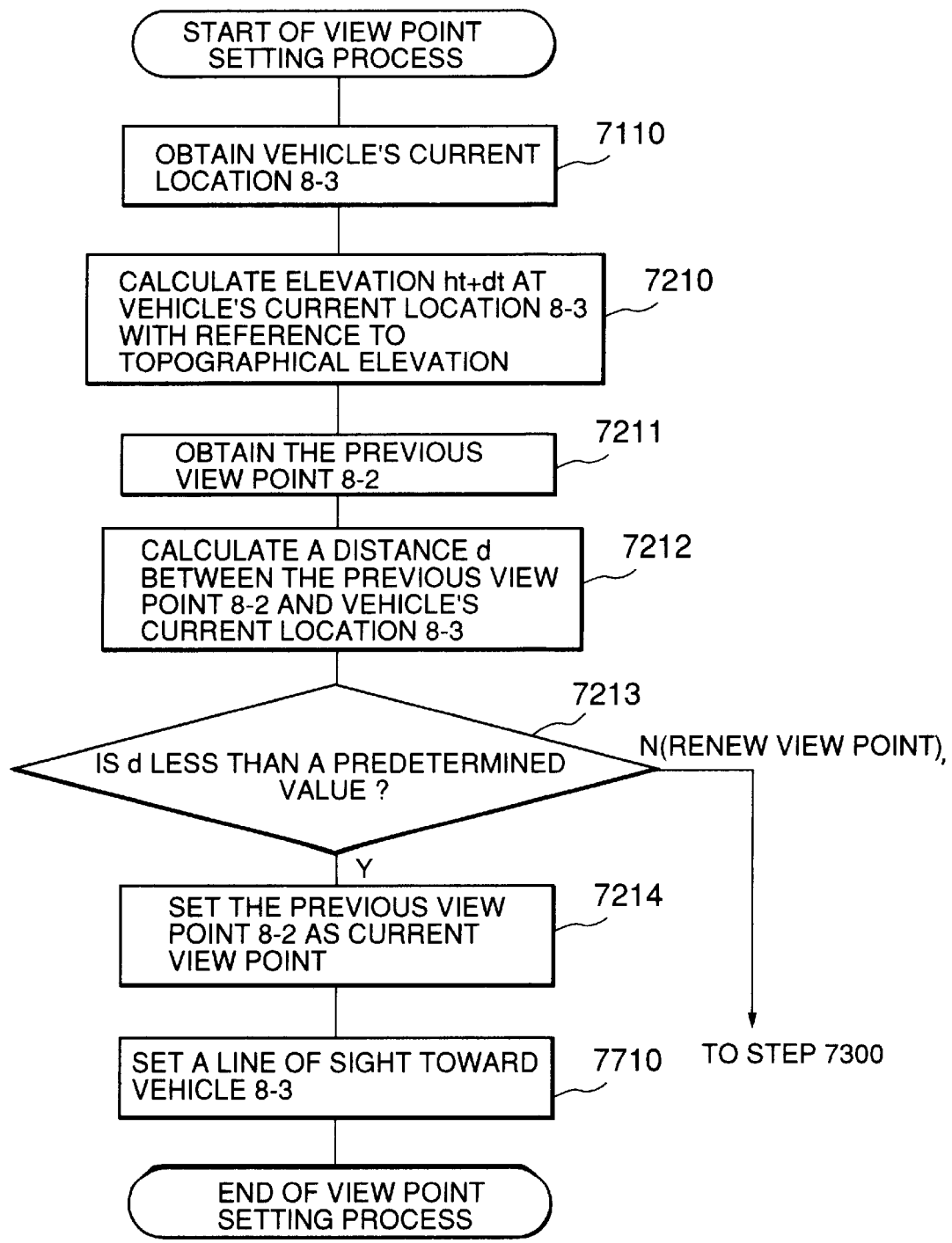
FIG. 9 is a flowchart for illustrating the view point setting method which changes a line of sight according to movement of the vehicle.

Another embodiment of the procedure of the view point setting unit 3-11 of the present invention will now be described with reference to FIG. 9.

In the present embodiment, procedure steps for displaying the vehicle and scenery around the vehicle while changing the view point with movement of the vehicle are added to the procedure of FIG. 7. Steps 7110, 7210, 7710 of the present procedure are the same as Steps 7100, 7200, 7700 of FIG. 7 respectively except that the current location of the vehicle in the present embodiment is assumed to be at the location 8-3 of FIG. 8.

In the present procedure, the view point setting unit 3-11 obtains the current location of the vehicle (Step 7110), calculates the vehicle elevation $h_{t+dt}$ (Step 7210), obtains the previous view point 8-2 (Step 7211), and calculates a distance d between the previous view point 8-2 and the vehicle's current location 8-3 (Step 7212).

Further, it is decided if the distance d is within a predetermined range or not (Step 7213). If the distance d is within the predetermined range (Y at Step 7213), the same view point is maintained (Step 7214), and only the line of sight is changed toward the new current location of the vehicle (Step 7710). If the distance d is larger than the predetermined range (N at Step 7213), the procedure proceeds to Step 7300 of FIG. 7.

Figure 10:
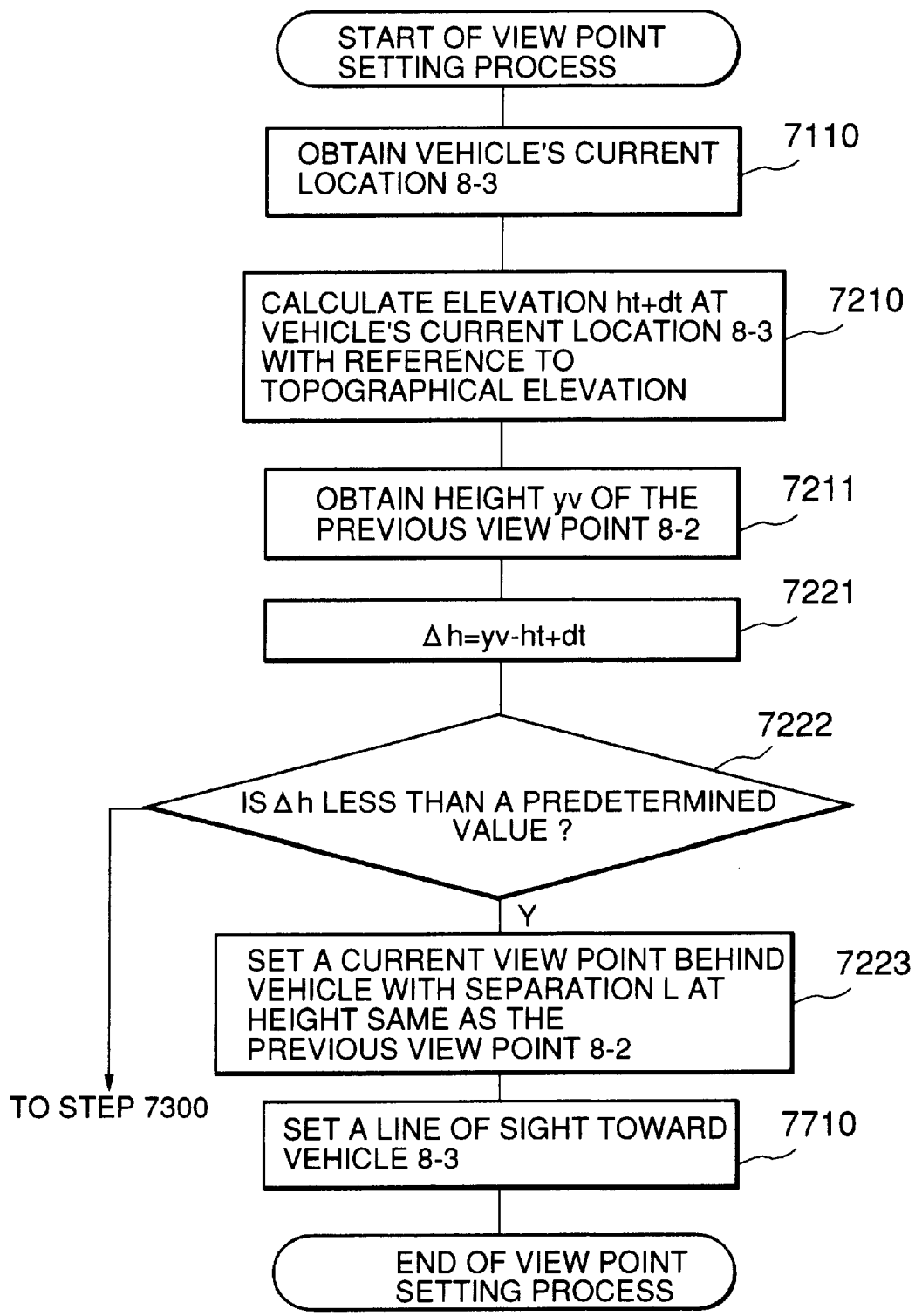
FIG. 10 is a flowchart for illustrating the view point setting method which fixes a height of the view point when an area has an almost a flat topographical feature.

A further embodiment of the procedure of the view point setting unit 3-11 of the present invention will now be described with reference to FIG. 10.

In the present embodiment, procedure steps for setting the view point height while judging its necessity of renewal based on an amount of topographical variation around the vehicle's current location are added to the procedure of FIG. 7. Steps 7110, 7210, 7710 of the present procedure are the same as Steps 7100, 7200, 7700 of FIG. 7 respectively except that the current location of the vehicle in the present embodiment is assumed to be at the location 8-3 of FIG. 8.

In the present procedure, the view point setting unit 3-11 obtains the vehicle's current location 8-3 (Step 7110), calculates the vehicle elevation $h_{t+dt}$ (Step 7210), obtains the previous view point height $y_v$ (Step 7211), calculates a height difference $\Delta h$ between the vehicle elevation $h_{t+dt}$ at its current location and the height of the previous view point (Step 7221), and checks if the height difference $\Delta h$ is within a predetermined range or not (Step 7222).

If the height difference $\Delta h$ is within the predetermined range (Y at Step 7222), the same height of the view point as the previous one is maintained and the new view point 8-4 is established with this height (Steps 7223, 7710). If not, the procedure proceeds to Step 7300 of FIG. 7.

The present procedure is required to be executed as the vehicle moves. Instead of the present procedure, it may be possible to divide the map into a plurality of meshes each having a predetermined map area, and to establish the view point height to a fixed value within each of the meshes by evaluating an amount of the topographical variation within the mesh. Alternatively, a section of roads where the view point height may be fixed may be specified beforehand by evaluating an amount of ups and downs of roads on which the vehicle is planning to travel.

Figure 11:
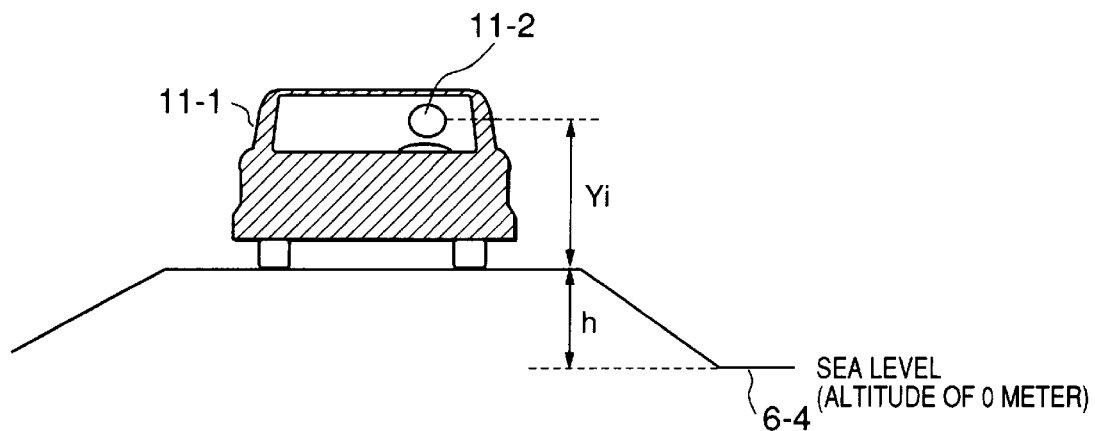
FIG. 11 is an explanatory illustration showing a concept of the view point setting method which establishes the view point inside of the vehicle.

A further embodiment of the procedure of the view point setting unit 3-11 of the present invention will now be described with reference to FIGS. 11 and 12.

In the present embodiment, the view point, which was established above in the air and behind the vehicle in the previous embodiments, is now established inside the vehicle. Concretely, the height of the view point 11-2 established inside the vehicle 11-1, which is moving on the ground of elevation h from sea level, is determined by adding the elevation h of the vehicle's current location and a predetermined height Yi. The view point established inside the vehicle will be called an inside-vehicle view point hereafter.

The procedure in the present embodiment is basically the same as that of FIG. 7 with the predetermined height Y being replaced with Yi in Step 7300, and makes it possible to establish the inside-vehicle view point. Further in the present embodiment, Steps 7400 and 7500 of FIG. 7 may be eliminated since the view point is always set above the ground plane at Step 7300.

Alternatively, the height Yi may be defined as a variable so that its value may be adjusted in response to the type of vehicle or a vehicle height which is inputted or selected by the user using the input device 1-5.

Figure 12:
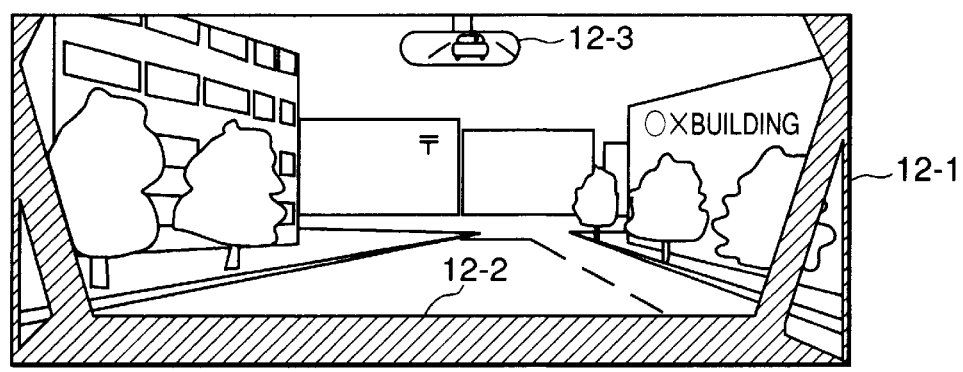
FIG. 12 is an explanatory illustration showing an example of the display when the view point is set inside the vehicle.

FIG. 12 illustrates an example 12-1 of the display showing a scenery image near an intersection with the inside-vehicle view point. The display example 12-1 also shows a part of the vehicle structure, which may be seen by the driver (user) when he or she is looking out from the inside of the vehicle, such as a front glass frame 12-2 and rear view mirror 12-3, superimposed on the scenery image. The part of vehicle structure may be graphically generated using its structural data which may be stored in a storage device such as the map database device 1-3 or the ROM 2-3.

Displaying the part of the vehicle structure superposed on the scenery image enables the user to relate an actual view from inside the vehicle and the displayed roads and buildings more easily, and thus increase the recognizability. Alternatively, the navigation system may be structured in such a way that the input device 1-5 accepts the user's selection regarding which part of the vehicle structure should be displayed, and the display image is generated according to the user's selection. Further, the display with more clarity may be realized by additionally executing transparent processing during the display procedure.

A further embodiment of the procedure of the view point setting unit 3-11 of the present invention will now be described with reference to FIG. 13.

The procedure of the present embodiment includes steps, in addition to the procedure illustrated in FIG. 7, for switching a location of the view point between inside and outside the vehicle depending on a view point height requested by the user. Further in the present embodiment, the input device 1-5 is structured so as to be able to accept a selection or switching operation from the user for changing the view point height stepwise.

In the present procedure, the view point height $y_v$ requested by the user is obtained (Step 1310), and then it is checked if the view point height $y_v$ is less than a predetermined height Y1 (Step 1320). If it is less than Y1, the view point height $y_v$ is established inside the vehicle using the method described with reference to FIG. 11 (Step 1330), and the line of sight is set along the moving direction of the vehicle (Step 1340).

If the view point height $y_v$ is not less than Y1 in Step 1320, the view point height $y_v$ is further checked to see if it is larger than another predetermined height Y2 (Step 1350). If it is larger than Y2, the line of sight is set in a direction vertical to the ground plane at sea level 6-4 (Step 1360). If the view point height $y_v$ is not less than Y1 and not larger than Y2, the view point height and a direction of the line of sight are determined using Steps 7200–7700 of FIG. 7.

Figure 14:
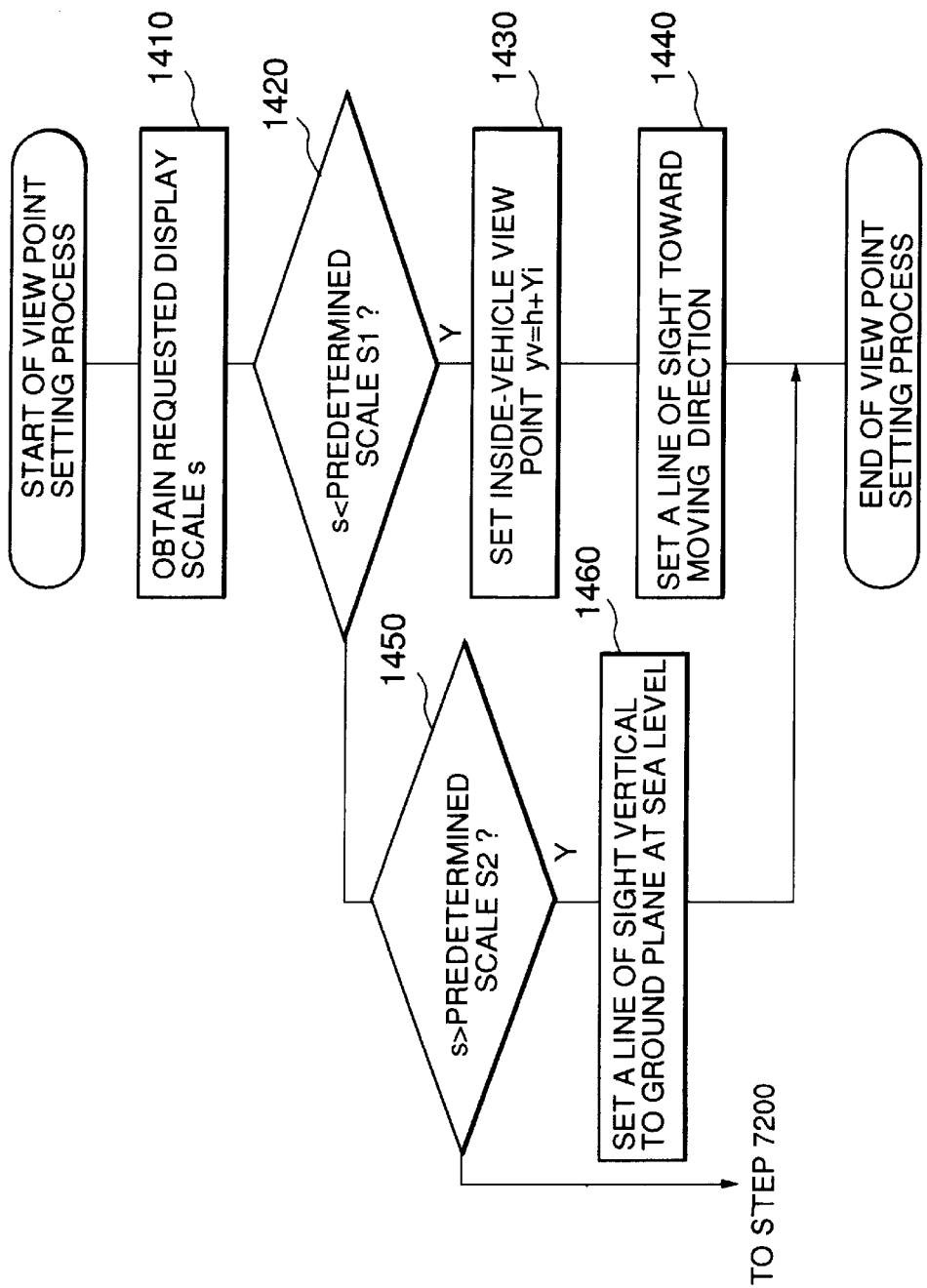
FIG. 14 is a flowchart for illustrating the view point setting method which switches the view point to inside or outside of the vehicle according to a scale of the display.

A further embodiment of the procedure of the view point setting unit 3-11 of the present invention will now be described with reference to FIG. 14.

The procedure of the present embodiment includes steps for switching a location of the view point between inside and outside the vehicle depending on a map display scale requested by the user, in addition to the procedure illustrated in FIG. 7. Further in the present embodiment, the input device 1-5 is structured so as to be able to accept a selection or switching operation from the user for changing the map display scale stepwise. Further, Steps 1430, 1440, 1460 in the present procedure are the same as Steps 1330, 1340, 1360 in the procedure shown in FIG. 13, respectively.

In the present procedure, the display scale s requested by the user is obtained (Step 1410), and then the display scale s is checked to see if it is less than a predetermined scale S1 (Step 1420). If it is less than S1, the view point height $y_v$ is established inside the vehicle using the method described with reference to FIG. 11 (Step 1430), and the line of sight is set along the moving direction of the vehicle (Step 1440).

If the display scale s is not less than S1 in Step 1420, the display scale s is further checked to see if it is larger than another predetermined scale S2 (Step 1450). If it is larger than S2, the line of sight is set in a direction vertical to the ground plane at sea level 6-4 (Step 1460). If the display scale s is not less than S1 and not larger than S2, the view point height and a direction of the line of sight are determined using Steps 7200–7700 of FIG. 7.

Figure 15:
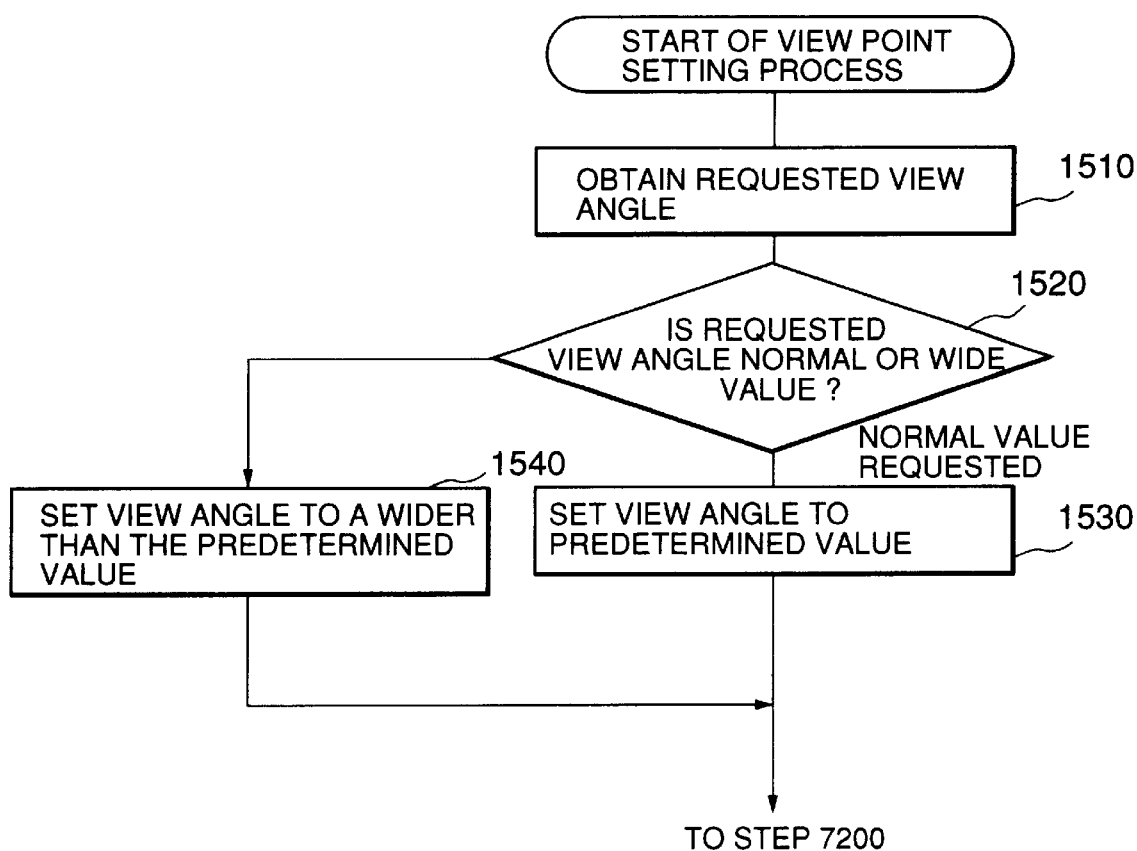
FIG. 15 is a flowchart for illustrating the view point setting method which varies a view angle according to a view angle selection of Normal/Wide.

A further embodiment of the procedure of the view point setting unit 3-11 of the present invention will now be described with reference to FIG. 15.

The procedure of the present embodiment includes steps which make it possible to switch a view angle for displaying the map according to a user request regarding variables such as a display format of the display device 1-2, in addition to the procedure illustrated in FIG. 7. Further in the present embodiment, the input device 1-5 is structured so as to be able to select either a wide display mode or a normal display mode for setting the view angle of the display.

First, in the present procedure, the view angle requested by the user is obtained (Step 1510), and a value of the view angle is checked so as to decide whether the display mode should be in the wide mode or the normal mode (Step 1520). If the normal display mode is selected, the view angle is set at a default value (Step 1530). If the wide display mode is selected, the view angle is set to a larger value than the default view angle (Step 1540). The procedure then proceeds to Step 7200 of FIG. 7 for determining the view point height and a direction of the line of sight.

The display size may be changed to a wider shape, for example, like the display example 12-1 shown in FIG. 12. Further, the switching procedures illustrated in FIGS. 13 and 14 for switching the view point between inside and outside the vehicle may be utilized in the present procedure so as to change the view angle in response to the switching of the view point location.

Figure 16:
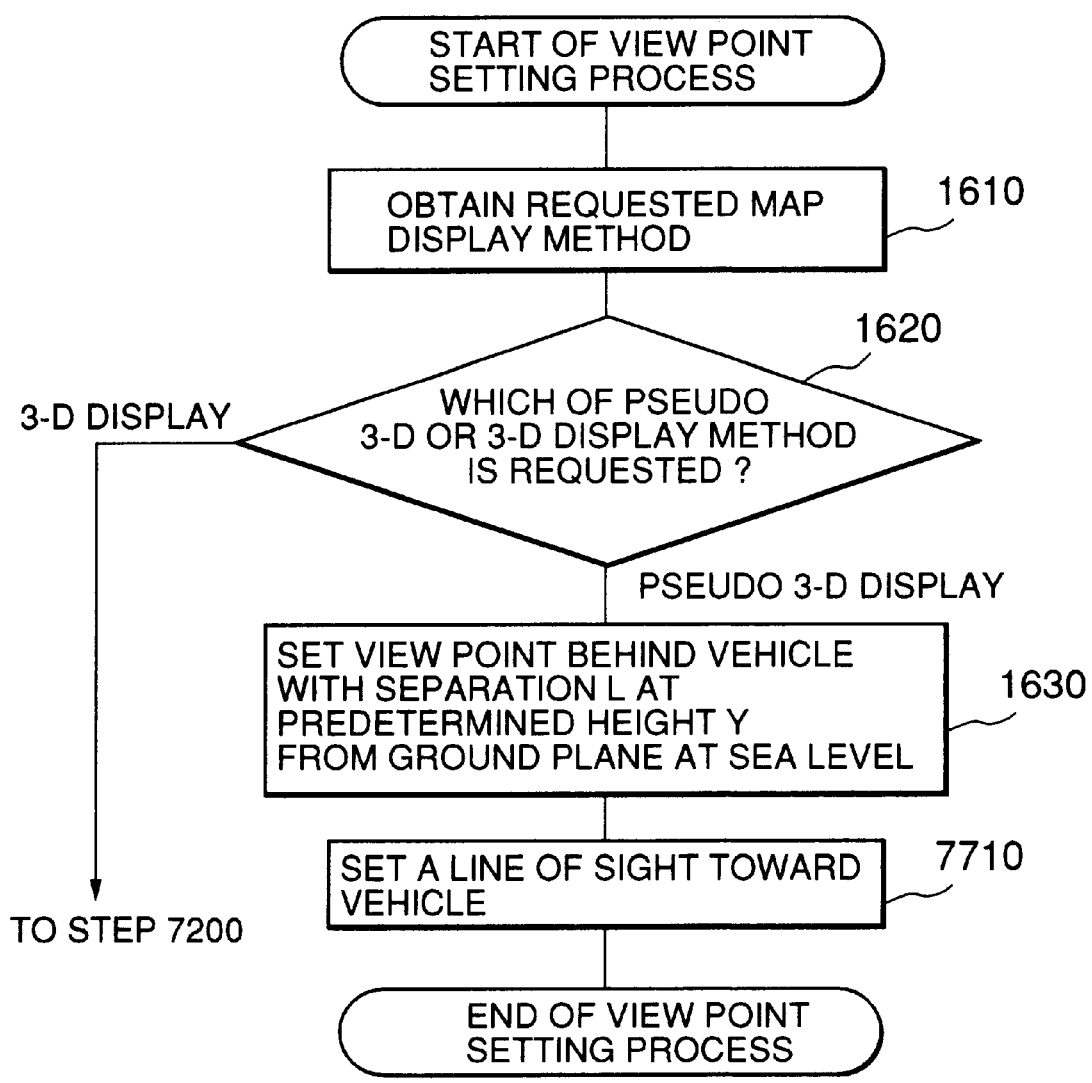
FIG. 16 is a flowchart for illustrating the view point setting method which varies a height of the view point according to a display method selection of the pseudo three dimensional display/the three dimensional display.

A further embodiment of the procedure of the view point setting unit 3-11 of the present invention will now be described with reference to FIGS. 16, 17A and 17B.

The procedure of the present embodiment includes steps for switching the view point in response to switching of the display method between a three dimensional display and a pseudo three dimensional display according to the user request, in addition to the procedure illustrated in FIG. 7. In the present specification, the three dimensional display method means a method for displaying a stereoscopic three dimensional map using the map information containing height information such as the elevation or the like, and the pseudo three dimensional display method means a method for generating a map image from the two dimensional map information through the perspective transformation so as to display the map which makes it possible to give a distinctive impression of distance.

Further in the present embodiment, the input device 1-5 is structured so as to be able to accept a request from the user for selecting either one of the three dimensional display and the pseudo three dimensional display. Step 7710 of the present procedure is the same as Step 7700 of FIG. 7.

In the present procedure, the display method requested by the user is obtained (Step 1610), and it is then decided if the display should be executed by the three dimensional display method or the pseudo three dimensional display method (Step 1620). If the three dimensional display method is selected, the procedure proceeds to Step 7200 of FIG. 7. There, as shown in FIG. 17A, the view point height $y_v$ is determined based on the topographic elevation $h_t$ at the vehicle's current location 8-3 and the predetermined height Y, and the view point 8-4 is set at a location behind the vehicle separated by the predetermined distance L with the view point height determined by Steps 7200–7700. If the pseudo three dimensional display method is selected, the view point 17-2 is set at a location behind the vehicle's current location 17-1 separated by the predetermined distance L and the predetermined height Y above sea level (Step 1630), and the line of sight is set along a direction toward the vehicle from the established view point (Step 7710).

The display processing unit 3-10 generates graphic data for displaying a perspective map viewed from the view point established in the above procedure using the display method selected by the user, and outputs the graphic data to the display device 1-2.

Alternatively, the procedure may be structured so that the height Y above sea level 6-4 may be switched to a fixed value during the switching of the display method in the present procedure.

A further embodiment of the procedure of the view point setting unit 3-11 of the present invention will now be described with reference to FIG. 18.

Figure 17A:
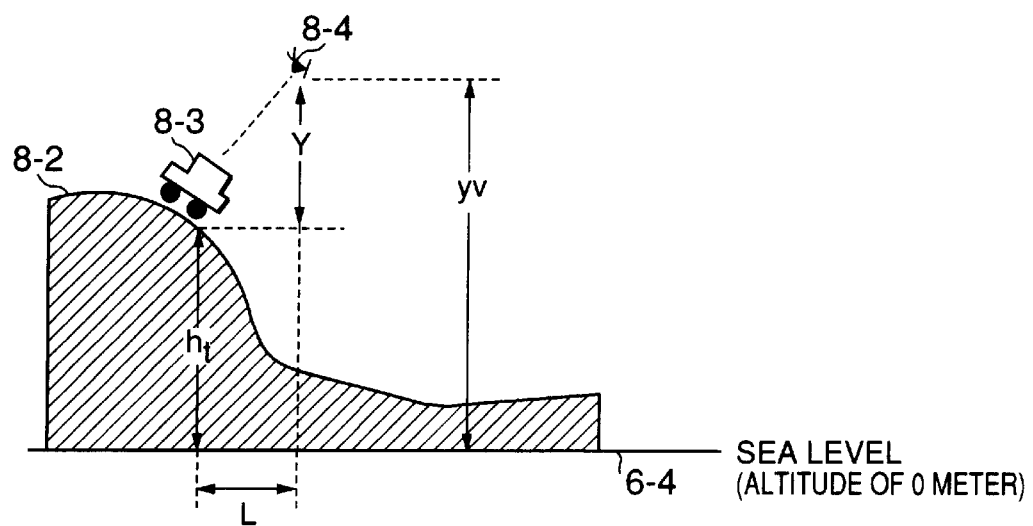
FIG. 17A is an explanatory illustration showing relative locations of the vehicle and the view point in the three dimensional display.
Figure 17B:
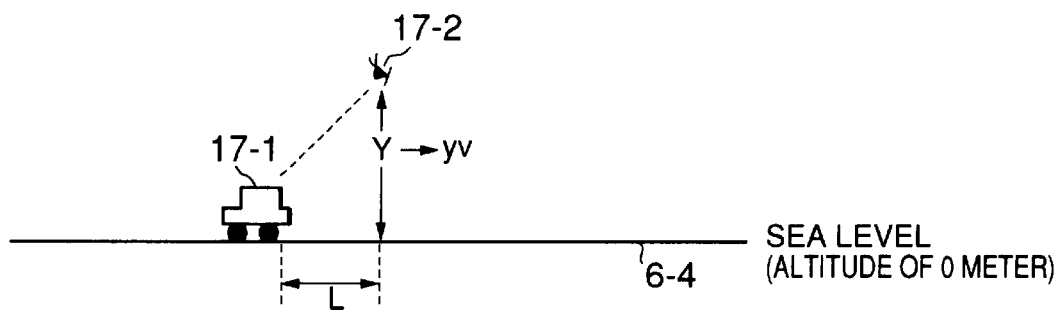
FIG. 17B is an explanatory illustration showing relative locations of the vehicle and the view point in the pseudo three dimensional display.

The procedure of the present embodiment includes steps for switching the view point to a location 8-4 or 17-2 of FIGS. 17A and 17B in response to a scroll request from the user, in addition to the procedure illustrated in FIG. 7. Further in the present embodiment, the input device 1-5 is structured so as to be able to accept a scroll request operation entered by the user. Step 7110 in the present procedure is the same as Step 7100 of FIG. 7.

In the present procedure, the vehicle's current location is obtained (Step 7110), and then it is decided if the user requests the scroll operation (Step 7111). If the scroll operation is requested, the view point 17-2 is set as shown in FIG. 17B at a predetermined height above the ground plane at sea level (Step 7112), and the line of sight from the view point is set along the scrolling direction (Step 7113).

In the present embodiment, the view point setting unit 3-11 establishes the view point height with respect to sea level when a scroll button disposed in the input device 1-5 is being pressed. A processing speed for renewing the display image may be gradually increased when the scroll button is kept pressed. Alternatively, the procedure may be structured so that a scroll speed or an elapse of time since the scroll button has been pressed may be checked if it is beyond a corresponding predetermined value in Step 7111 when the display is controlled in such a way that the display image is renewed at a constant period, and the above switching procedure may be executed if the scroll speed or the elapse of time is beyond the corresponding predetermined value.

An example of data structure in the map database device 1-3 of the present invention will now be described.

Figure 19:
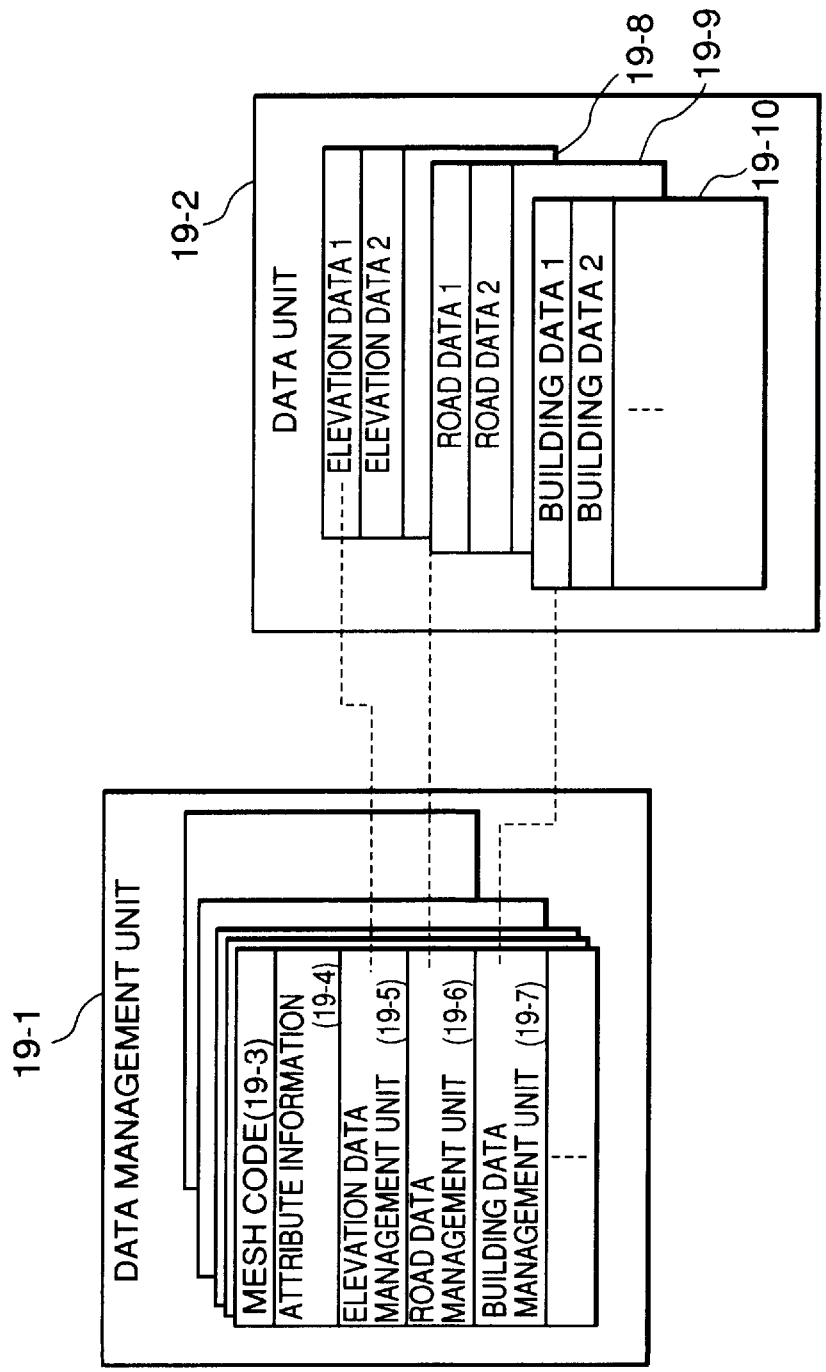
FIG. 19 is an explanatory illustration showing an example of a data format of the map database according to the present invention.

Map data of the present example comprises a data management unit 19-1 and a data unit 19-2 as illustrated in FIG. 19. The map data may be managed, for example, using a "standard area mesh" which is obtained by dividing a total area with longitude and latitude lines separated from each other by fixed amounts. An identification number called a mesh code is given to each of the standard area mesh.

The data management unit 19-1 stores a plurality of management tables each corresponding to a respective one of the standard area meshes. Each of the management table stores the mesh code 19-3, attribute information 19-4, an elevation data management unit 19-5, a road data management unit 19-6, a building data management unit 19-7, and the like.

The attribute information 19-4 stores a scale of the map, a date of the map data generation, and a number/name of the map. The elevation data management unit 19-5 stores link destinations in an elevation data 198. The elevation data 19-8 comprises elevation values sampled at locations which are equally separated from each other in the standard area mesh, and makes it possible to generate a display image of its topographical feature.

The road data management unit 19-6 stores link destinations in a road data 19-9 in a similar way. The road data 19-9 stores link information connecting intersections (nodes), node coordinates, attribute information identifying a type of road such as a toll road or a national road, road height information, and the like. Further, the building data management unit 197 stores link destinations in building data 19-10. The building data 19-10 stores information such as names, shapes, and heights of the buildings.

Further, identification codes will be stored for indicating availability of no link destination in the road/building elevation information stored in one of the data management units 19-5–19-7 and the data 19-8–19-10 due to the lack of the corresponding data.

A further embodiment of the procedure of the view point setting unit 3-11 of the present invention will now be described with reference to FIGS. 20–22.

The procedure of the present embodiment includes steps for switching the view point in response to the above described identification codes, which may be obtained by utilizing the map database device 1-3 with the data structure described in FIG. 19, in addition to the procedure illustrated in FIG. 7.

Figure 20:
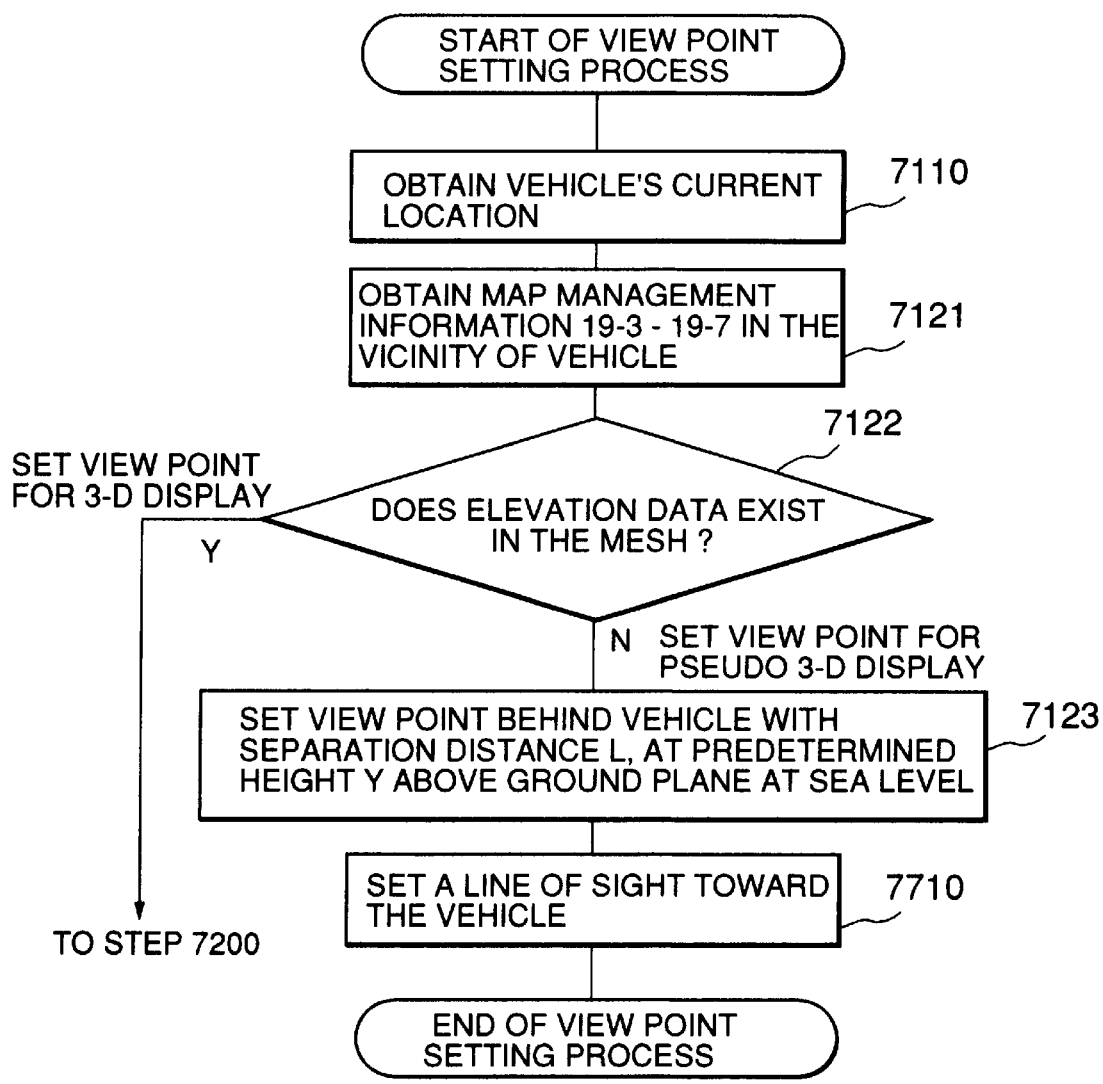
FIG. 20 is a flowchart for illustrating the view point setting method which varies a height of the view point according to whether information regarding elevations of the topographical features are available or not.

FIG. 20 shows an example of the procedure for switching the view point in response to detection of elevation information of the topographic feature (elevation data). Steps 7110, 7710 and 7123 in the present procedure are the same as Steps 7100, 7700 of FIG. 7 and Step 1630 of FIG. 16 respectively.

In the present procedure, the map management information 19-3–19-7 of the standard area mesh corresponding to an area in the vicinity of the vehicle's current location are fetched from the map database device 1-3, and contents of the map management information are obtained (Step 7121). Further, it is decided if the elevation information of topographical feature is available or not in the corresponding standard area mesh by checking the elevation data management unit 19-5 of the obtained map information (Step 7122).

If the elevation information of topographic feature is available, the procedure proceeds to Step 7200 of FIG. 7, and establishes the view point and the line of sight for the three dimensional display according to Steps 7200–7700. If the elevation information of topographic feature is not available, the procedure proceeds to Step 7123 to set the view point for the pseudo three dimensional display at the location 17-2 of FIG. 17B and the line of sight along a direction toward to the vehicle (Step 7710).

Figure 21:
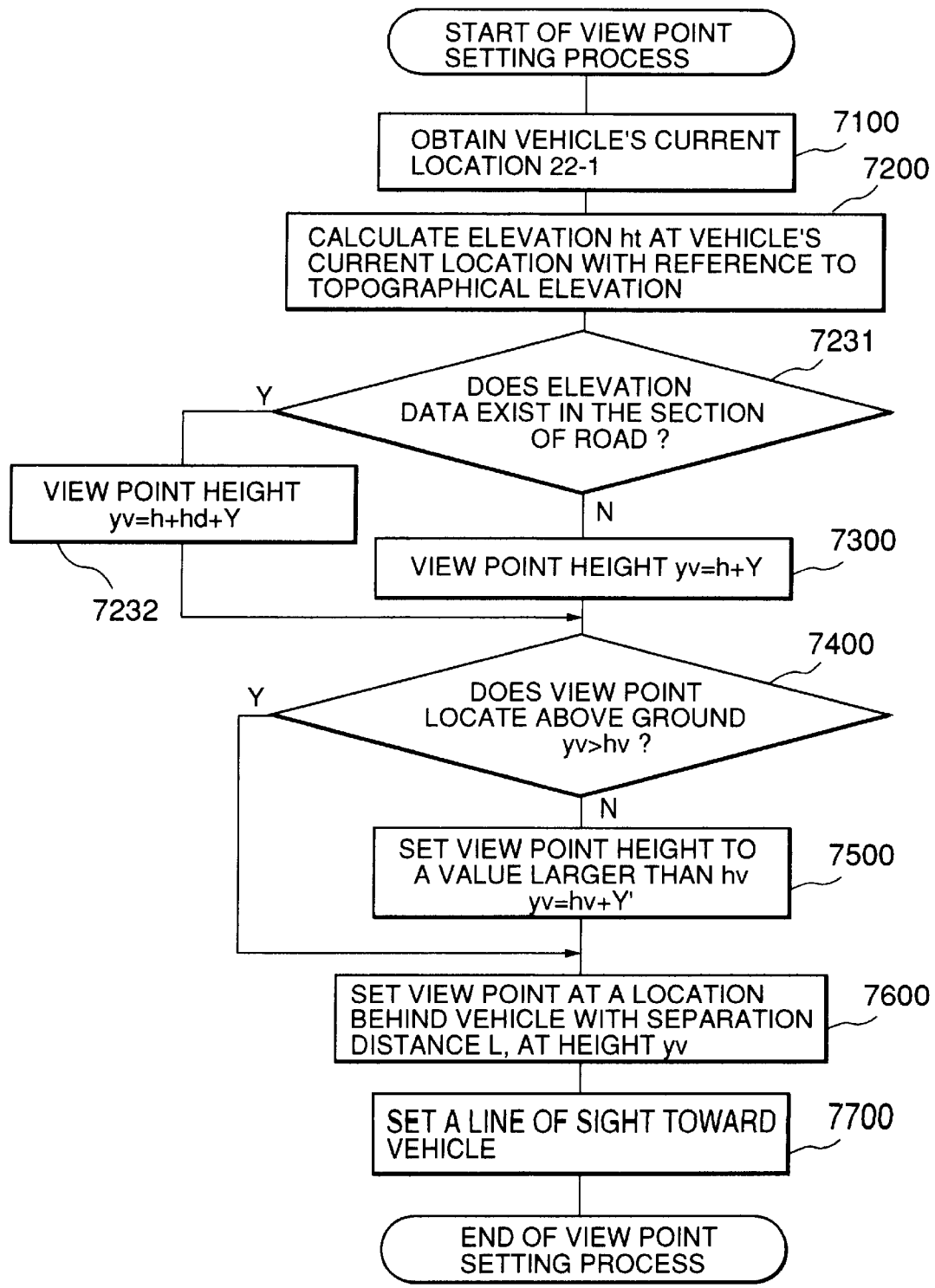
FIG. 21 is a flowchart for illustrating the view point setting method which varies a height of the view point according to whether information regarding elevations of the roads are available or not.
Figure 22:
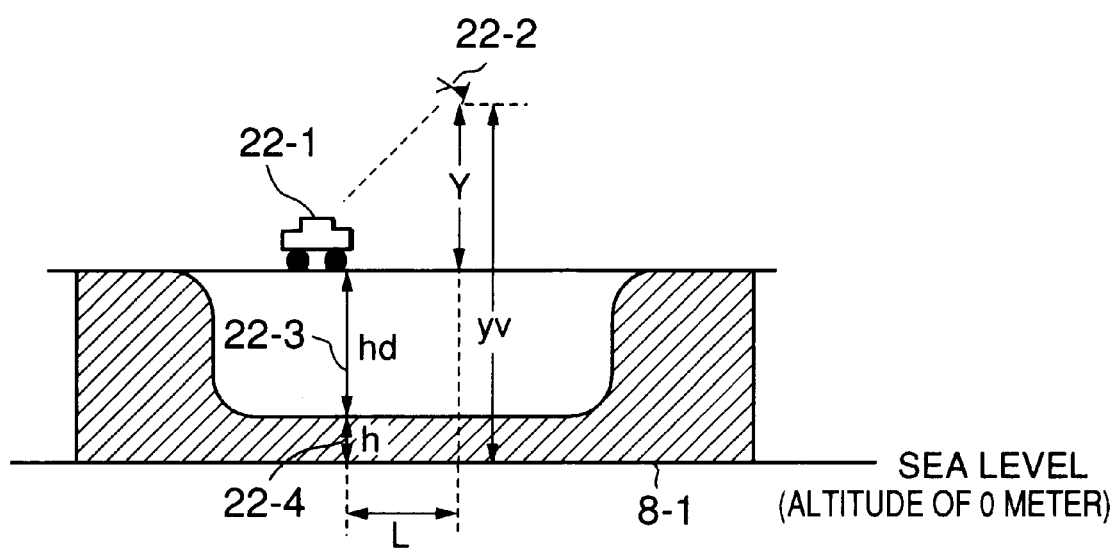
FIG. 22 is an explanatory illustration for supplementing FIG. 21.

FIG. 21 illustrates an example of the procedure for switching the view point in response to detection of the elevation information of the road. FIG. 22 is an explanatory illustration supplementing FIG. 21. The procedure of the present embodiment includes Steps 7231, 7232 in addition to the procedure illustrated in FIG. 7. In the present procedure, these additional steps are placed after Step 7200 of FIG. 7, and the vehicle is assumed to be located at a location 22-1 of FIG. 22.

In the present procedure, it is decided if the elevation information of road is available or not by checking the road data 19-9 included in the obtained map information at the vehicle's current location 22-1 (Step 7231). If the road elevation hd 22-3 is available, the view point height $y_v$ is calculated from the road elevation hd, the topographic elevation h and the predetermined height Y (Step 7232), and the view point 22-2 is established behind the vehicle with the predetermined separation L. If the road elevation hd is not available, the view point is established according to Steps 7300–7700.

Alternatively, when data from a plurality of meshes are simultaneously developed into a display image, the procedure may be structured so as to set the view point 17-2 for the pseudo three dimensional display if the mesh with no elevation data of topographic feature is included.

Further, if the map database includes identification information for identifying a section of a road which is located inside a tunnel, the procedure may be structured so as to switch the view point to the inside-vehicle view point using the identification information for deciding when the road section where the vehicle is currently moving is identified as inside the tunnel.

A further embodiment of the map display method of the present invention will be described with reference to FIGS. 23A and 23B.

In the present embodiment of the map display method, a shape/color/pattern/size of the vehicle's display image is varied in response to a change in the display setting condition such as the view point, the line of sight, the view angle and the like.

Figure 23A:
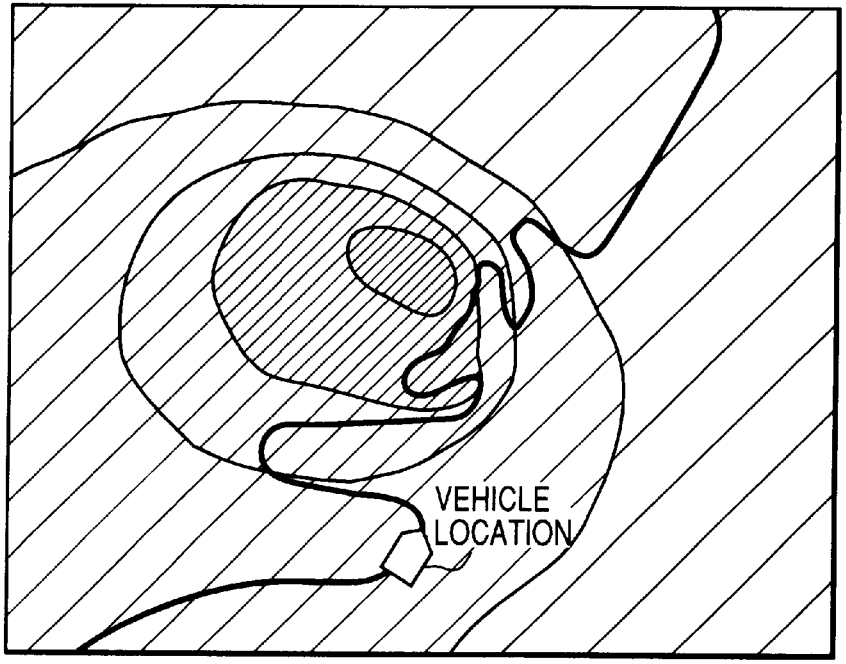
FIG. 23A is an display example of the vehicle when the view point is set at a higher position.
Figure 23B:
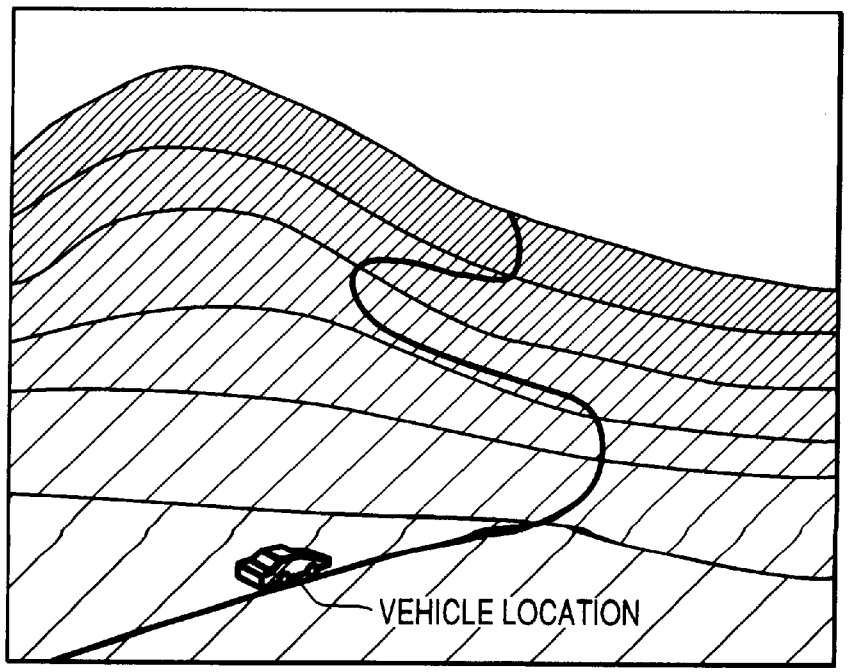
FIG. 23B is an display example of the vehicle when the view point is set at a lower position.
Figure 24:
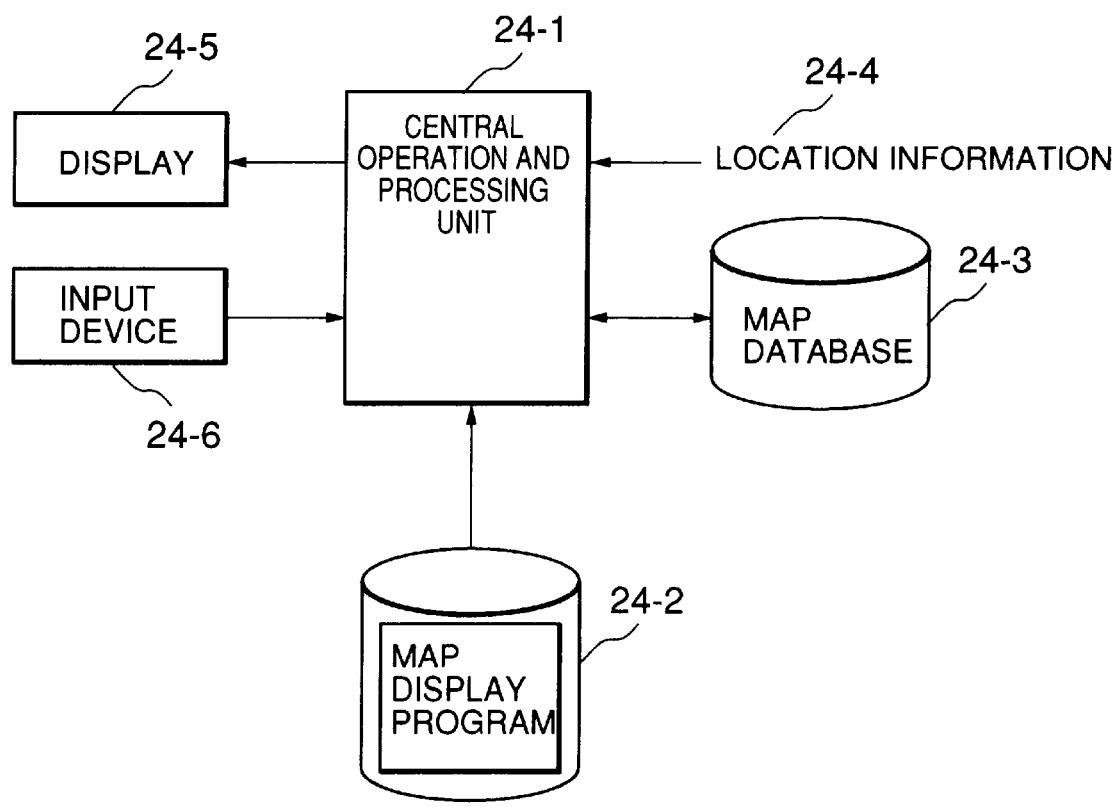
FIG. 24 is a block diagram showing a construction of a map display apparatus in another embodiment of the present invention.

To be concrete, the vehicle symbol may be displayed in a simple form as shown in FIG. 23A when the view point is set at a higher or distant location to the vehicle, and displayed in a stereoscopic form as shown in FIG. 23B when the view point is set at a lower or closer location to the vehicle.

Figure 13:
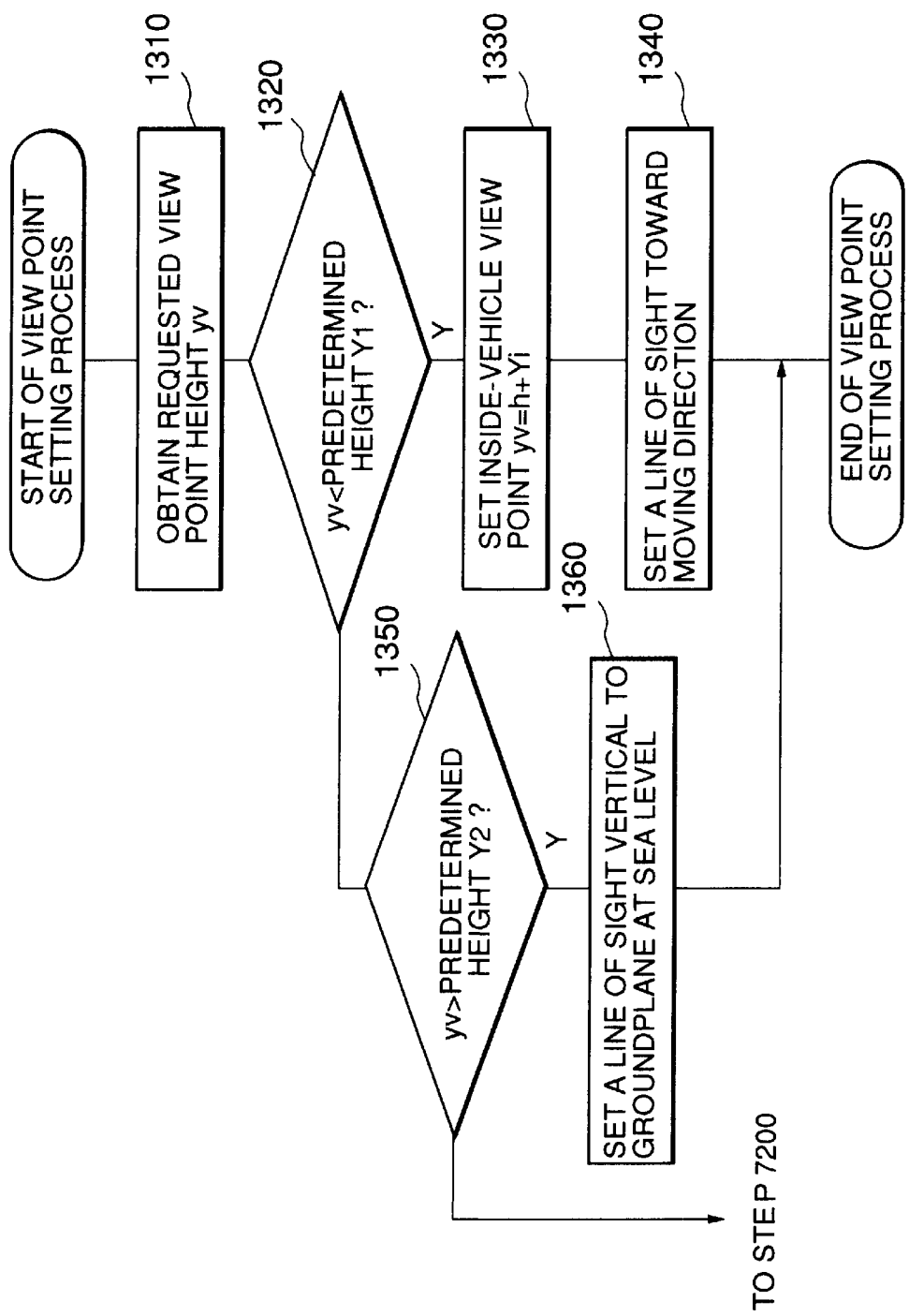
FIG. 13 is a flowchart for illustrating the view point setting method which switches the view point to inside or outside of the vehicle according to a height of the view point.

The above process may be realized by switching structural data of the vehicle symbol to be used, for example, according to a result of the decision at Step 1320 or 1350 in FIG. 13. Further, the display form of the vehicle symbol may be changed in response to the switching of the display method between the three dimensional display and the pseudo three dimensional display if the change of the vehicle's display form is executed depending on a result of the decision at Step 1620 in FIG. 16.

According to the present invention as described above, the map data including topographic features, roads, and buildings in the vicinity of the current location of the vehicle is read from the map database as the vehicle moves, and the view point is continuously renewed so as to be established at a point which is higher than the elevation of topographic feature in the vicinity of the vehicle's current location. Therefore, it is possible to provide the navigation system which makes it possible to maintain the view point above the ground surface even with the topographical variation, and renew the scenery image smoothly with the vehicle's motion.

In the above mentioned embodiments, the map display methods employed in the navigation system with the structure shown in FIG. 1 are described as examples. However, the map display method of the present invention is not limited to these embodiments. For example, a system may be realized by storing programs for executing the map display method in storage media such as floppy disks, CDs or the like, and loading the programs into a conventional computer system for executing the loaded programs.

Concretely, a map display apparatus may be realized for executing various map display methods mentioned above by storing a map display program for executing the map display method of the present invention into a storage medium 24-2, and loading the map display program into a computer system comprising a central operation and processing device 24-1, a display 24-5 and an input device 24-6 for executing the map display program. There, the map database 24-3 is connected to the computer system for providing map information, and location information 24-4 indicating a location to be displayed is fed to the computer system. The location information may be provided, for example, from a GPS card which is connected to a computer and functions as a GPS receiver.

In the above embodiments, the navigation system for an automobile is assumed as an example of the present invention. However, the present invention is also applicable to a portable navigation system for other types of moving object such as a person, who may use the system during trekking or the like in the same way as the previous embodiments.

According to the present invention, it is possible to provide a map display method and apparatus which makes it possible to display a stereoscopic map image based on three dimensional map information.

Further, according to the present invention, it is possible to provide a navigation system having a function to display a stereoscopic map image, which makes it possible to renew a scenery image smoothly with movement of the vehicle, regardless of topographic variation.

What is claimed is:

1. A navigation system comprising a map database device for storing map information at least including information regarding topographical features and roads; a current location detection device for detecting a current location of an automobile on which said navigation system is mounted; a map display device for fetching map information in an area specified in response to said detected current location of said automobile, generating a perspective map viewing the ground plane from a view point using said obtained map information, and generating graphic data for displaying a scenery image corresponding said perspective map; and a display device for displaying a map image according to said graphic data, wherein said map display device comprises a view point setting unit for executing at least setting procedures of said view point among variables to be set for generating said perspective map; and a display processing unit for generating graphic data for displaying a scenery image corresponding to said perspective map generated in response to said view point established by said view point setting unit, said map database includes height information of a topographic feature existing at least in a part of an available map area, and said view point setting unit establishes said view point based on said height information in a display area or an area including the display area which is specified in response to said detected current location of said automobile when said height information of a topographical feature is included in the display area or the area including the display area.

2. A map display apparatus in accordance with claim 1, further comprising a user interface for accepting requests to set at least one of a type and a height of said automobile, wherein said map display device establishes said view point using said established variables in response to the accepted request, and generates graphic data for displaying a scenery image corresponding to said perspective map generated using said established view point.

3. A map display apparatus connecting to a map database and a display device for displaying a map, in which map information in an area specified in response to a location indicated by an input location information is read from the map database; a perspective map looking from a view point toward a ground plane is generated using said obtained map information; graphic data for displaying a scenery image corresponding to said perspective map is generated; and the graphic data is outputted to said display device, comprising a view point setting unit for setting at least a height of said view point among variables to be set for generating said perspective map, and a display processing unit for generating graphic data for displaying a scenery image corresponding to said perspective map generated in response to said view point established by said view point setting unit, wherein said map database includes height information of map constituent elements existing at least in a part of an available map area, and said view point setting unit establishes said view point based on said height information when said height information is available for the map including the constituent elements in a display area or an area including the display of said perspective map.

4. A map display apparatus in accordance with claim 3, wherein said location indicated by said input location information is a current location of a moving object, and said view point setting unit repeats its view point setting procedure when renewed location information is provided with movement of said moving object.

5. A map display apparatus in accordance with claim 4, wherein said view point setting unit establishes and maintains said view point so as to keep a predetermined relative spatial relationship to a current location of the moving object.

6. A map display apparatus in accordance with claim 4, wherein said view point setting unit keeps the previous view point position, and reestablishes a line of sight so as to be able to capture said moving object in the current location within its field of view if a relative spatial relationship between the newly-provided current location of said moving object and the previously-established view point satisfies a predetermined condition range.

7. A map display apparatus in accordance with claim 4, wherein said view point setting unit fixes the height of said view point when said moving object is located within a part of an area extending a predetermined range from the current location of said moving object if an amount of topographic variation in the area is not larger than a predetermined value.

8. A map display apparatus connecting to a map database and a display device for displaying a map, in which map information in an area specified in response to a location indicated by an input location information is read from the map database; a perspective map looking from a view point toward a ground plane is generated using said obtained map information; graphic data for displaying a scenery image corresponding to said perspective map is generated; and the graphic data is outputted to said display device, comprising a view point setting unit for setting at least a height of said view point among variables to be set for generating said perspective map, and a display processing unit for generating graphic data for displaying a scenery image corresponding to said perspective map generated in response to said view point established by said view point setting unit, wherein said map database includes height information of map constituent elements existing at least in a part of an available map area, wherein said location indicated by said input location information is a current location of an automobile, and said view point setting unit establishes said view point for generating said perspective map looking from inside of said automobile based on said height information of the map constituent element at the current location of said automobile and a height of said automobile's body.

9. A map display apparatus in accordance with claim 3, further comprising input means for accepting requests from a user regarding the height of said view point to be set, wherein said input location information is a current location of an automobile, and when said requested height of said view point is not larger than the first predetermined value, said view point setting unit establishes said view point inside of said automobile, and when said requested height of said view point is larger than the second predetermined value, said view point setting unit establishes said view point above and behind said automobile.

10. A map display apparatus in accordance with claim 3, further comprising input means for accepting requests from a user regarding a display scale to be set, wherein said moving object is an automobile, and when said requested display scale is not larger than the third predetermined value, said view point setting unit establishes said view point inside of said automobile, and when said requested display scale is larger than the fourth predetermined value, said viewpoint setting unit establishes said view point above and behind said automobile.

11. A map display apparatus in accordance with claim 4, further comprising input means for accepting requests regarding a view angle to be set for generating said perspective map, wherein said display processing unit sets a value of a view angle to one of a predetermined normal value and a wide value larger than said normal value according to said accepted request, and generates graphic data for displaying said perspective map in accordance with said established view angle.

12. A map display apparatus in accordance with claim 5, further comprising selection means for accepting requests regarding a selection of a display method between a pseudo three dimensional display method which makes it possible to give a distinctive impression of distance by executing perspective transformation procedures on two dimensional horizontal data containing said map information, and a three dimensional display method which displays a scenery image using two dimensional horizontal data and said height information of map constituent elements included in said map information, wherein when said pseudo three dimensional display method is selected, said view point setting unit establishes said view point at a predetermined height with respect to the ground plane at sea level and when said three dimensional display method is selected, said view point setting unit establishes said view point based on said height information of the map constituent element at said input location or a location which is separated from said input location for a predetermined distance.

13. A map display apparatus in accordance with claim 12, wherein said view point setting unit establishes a height of said view point so as to maintain a predetermined spatial relationship to said input location before and after the chance when said display method is changed by said selection means between said pseudo three dimensional display method and said three dimensional display method.

14. A map display apparatus in accordance with claim 3, further comprising decision means for deciding if said height information said obtained map information, wherein said view point setting unit establishes said view point based on said height information when said decision means decides that said height information is included in said map information, and establishes said view point at a predetermined height with respect to the ground plane at sea level when said decision means decides that said height information is not included.

15. A map display apparatus in accordance with claim 3, further comprising decision means for deciding if said height information is included in said obtained map information, wherein said view point setting unit establishes said view point at a predetermined height with respect to the ground plane at sea level for displaying the map using a pseudo three dimensional display method if a plurality of map meshes to be displayed are further included in said map information, and said decision means decides that at least one of said map meshes contains no height information.

16. A map display apparatus connecting to a map database and a display device for displaying a map, in which map information in an area specified in response to a location indicated by an input location information is read from the map database; a perspective map looking from a view point toward a ground plane is generated using said obtained map information; graphic data for displaying a scenery image corresponding to said perspective map is generated; and the graphic data is outputted to said display device, comprising a view point setting unit for setting at least a height of said view point among variables to be set for generating said perspective map, and a display processing unit for generating graphic data for displaying a scenery image corresponding to said perspective map generated in response to said view point established by said view point setting unit, wherein said view point setting unit establishes said view point based on height information of map constituent element when said height information exists for the map constituent element in a display area specified in response to a location indicated by the input location information or an area including the display area, said display processing unit generates graphic data for displaying a graphic image illustrating said moving object superposed on a scenery image to be displayed, and changes said graphic image of said moving object in response to a change of a relative spatial relationship between said established view point and said moving object due to a change in the setting condition of said view point setting unit.

17. A map display method in which map information in an area specified in response to a location indicated by an input location information is read from a map database; a perspective map looking toward a ground plane from a view point is generated using said obtained map information; and a scenery image corresponding to said perspective map is displayed on a display device, wherein said map database includes height information of map constituent elements in a display area or an area including the display area of said perspective map, and said view point for generating said perspective map is established based on said height information.

18. A map display method in accordance with claim 17, wherein said view point is renewed every time a new input location information is provided.

19. A map display method in accordance with claim 17, wherein said input location information is a current location of a moving object, and a new height of said view point is established every time said current location of the moving object is renewed.

20. A medium storing programs for realizing a display apparatus with a computer system by reading out the programs from said medium and executing the programs in which map information in an area specified in response to a location indicated by an input location information is read from a map database; a perspective map looking from a view point toward the ground plane is generated using said obtained map information; and a scenery image corresponding to said perspective map is displayed on a display device, wherein said view point for generating said perspective map is established above a height of a map constituent element existing at a map location specified in response to said location indicated by said input location information when information regarding said height of said constituent element is included in said map database, and said height of said view point is reset when new input information is provided.

21. A map display apparatus connecting to a map database and a display device for displaying a map, in which map information in an area specified in response to a location indicated by an input location information is read from the map database; a perspective map looking from a view point toward a ground plane is generated using said obtained map information; graphic data for displaying a scenery image corresponding to said perspective map is generated; and the graphic data is outputted to said display device, comprising a view point setting unit for setting at least a height of said view point among variables to be set for generating said perspective map, and a display processing unit for generating graphic data for displaying a scenery image corresponding to said perspective map generated in response to said view point established by said view point setting unit, wherein said map database includes height information of map constituent elements existing at least in a part of an available map area, and said view point setting unit establishes said view point based on said height information of map constituent elements at said input location or a location separating a predetermined distance from said input location when said height information is available for the map constituent elements in a display area or an area including the display area of said perspective map.

22. A map display apparatus in accordance with claim 21, further comprising input means for accepting requests from a user regarding the height of said view point to be set, wherein said input location information is a current location of an automobile, and when said requested height of said view point is not larger than a first predetermined value, said view point setting unit establishes said view point inside of said automobile, and when said requested height of said view point is within a second predetermined range, said view point setting unit establishes said view point above and behind said automobile.

23. A map display apparatus in accordance with claim 21, further comprising input means for accepting requests from a user regarding a display scale to be set, wherein said input location information is a current location of an automobile, and when said requested display scale is not larger than a third predetermined value, said view point setting unit establishes said view point inside of said automobile, and when said requested display scale is within a fourth predetermined range, said view point setting unit establishes said view point above and behind said automobile.

24. A map display apparatus in accordance with claim 21, wherein said view point is renewed every time a new input location information is provided.

25. A map display apparatus in accordance with claim 21, wherein said input location information is a current location of a moving object, and a new height of said view point is established every time said current location of the moving object is renewed.

26. A map display apparatus in accordance with claim 21, further comprising decision means for deciding if said height information is included in said obtained map information, wherein said view point setting unit establishes said view point based on said height information when said decision means decides that said height information is included in said map information, and establishes said view point at a predetermined height with respect to the ground plane at sea level when said decision means decides that said height information is not included.

27. A map display apparatus in accordance with claim 21, further comprising decision means for deciding if said height information is included in said obtained map information, wherein said view point setting unit establishes said view point at a predetermined height with respect to the ground plane at sea level for displaying the map using a pseudo three dimensional display method if a plurality of map meshes to be displayed are further included in said map information, and said decision means decides that at least one of said map meshes contains no height information.

* * * * *